(12) United States Patent
Young

(10) Patent No.: US 9,206,886 B2
(45) Date of Patent: Dec. 8, 2015

(54) CHAIN TENSIONER

(71) Applicant: James D. Young, Chesaning, MI (US)

(72) Inventor: James D. Young, Chesaning, MI (US)

(73) Assignee: Cloyes Gear and Products, Inc., Fort Smith, AR (US)

( * ) Notice: Subject to any disclaimer, the term of this patent is extended or adjusted under 35 U.S.C. 154(b) by 135 days.

(21) Appl. No.: 14/101,157

(22) Filed: Dec. 9, 2013

(65) Prior Publication Data

US 2014/0162819 A1    Jun. 12, 2014

Related U.S. Application Data

(60) Provisional application No. 61/735,028, filed on Dec. 9, 2012.

(51) Int. Cl.
*F16H 7/08*    (2006.01)

(52) U.S. Cl.
CPC .......... *F16H 7/08* (2013.01); *F16H 2007/0804* (2013.01); *F16H 2007/0872* (2013.01); *F16H 2007/0893* (2013.01)

(58) Field of Classification Search
CPC ..... F16H 7/08; F16H 7/18; F16H 2007/0802; F16H 2007/0804; F16H 2007/0863; F16H 2007/0872; F16H 2007/0889; F16H 2007/0893; F16H 2007/185; F16H 2007/0895; F16H 2007/0897
USPC .................................................. 474/111, 140
See application file for complete search history.

(56) References Cited

U.S. PATENT DOCUMENTS 3,490,302 A    1/1970    Turner et al.
4,921,472 A    5/1990    Young
5,055,088 A    10/1991   Cradduck et al.
5,266,066 A    11/1993   White
5,286,234 A    2/1994    Young (Continued)

FOREIGN PATENT DOCUMENTS

| EP | 0 581 219 A1 | 2/1994 |
| WO | WO 97/33104 | 9/1997 |
| WO | WO 2010/059698 | 5/2010 |

OTHER PUBLICATIONS

International Search Report mailed Mar. 7, 2014 for International Application No. PCT/US2013/073945.

(Continued)

*Primary Examiner* — Sang Kim
*Assistant Examiner* — Juan Campos, Jr.
(74) *Attorney, Agent, or Firm* — Fay Sharpe LLP

(57) ABSTRACT

A chain tensioner includes a shoe including a first spring-receiving slot and a second spring-receiving slot. The first slot includes a first side wall and a first installation tab. The second slot includes a second side wall and a second installation tab. A stack of one or more leaf springs is installed into the first and second spring-receiving slots over first and second installation tabs, and a first end of the stack is laterally retained in the first slot between the first installation tab and first side wall, and a second end of the stack is laterally retained in the second slot between the second installation tab and second side wall. The installation tabs are necessarily lower in height than first and second side walls to allow the spring stack to be installed thereover. The first and second installation tabs are each located in an outboard position and the first and second side walls are located in an inboard position. The outboard position enables the installation tabs to capture the spring stack despite the lower height.

19 Claims, 18 Drawing Sheets

(56) References Cited

U.S. PATENT DOCUMENTS

| | | | |
|---|---|---|---|
| 5,425,680 | A | 6/1995 | Young |
| 5,711,732 | A | 1/1998 | Ferenc et al. |
| 5,797,818 | A | 8/1998 | Young |
| 5,984,815 | A | 11/1999 | Baddaria |
| 6,238,311 | B1 | 5/2001 | Cutting |
| 6,354,972 | B1 | 3/2002 | Young |
| 6,364,796 | B1 | 4/2002 | Nakamura et al. |
| 6,375,587 | B1 | 4/2002 | Wigsten |
| 6,440,020 | B1 | 8/2002 | Tada |
| 6,524,202 | B1 | 2/2003 | Tada et al. |
| 6,572,502 | B1 | 6/2003 | Young et al. |
| 6,609,986 | B1 | 8/2003 | Wigsten |
| 6,612,952 | B1 * | 9/2003 | Simpson et al. .............. 474/111 |
| 6,612,953 | B2 | 9/2003 | Tada |
| 6,616,557 | B2 | 9/2003 | Tsuruta et al. |
| 6,623,391 | B2 | 9/2003 | Young et al. |
| 6,641,496 | B2 | 11/2003 | Tada |
| 6,808,467 | B2 | 10/2004 | Takeda et al. |
| 6,835,149 | B2 | 12/2004 | Konno et al. |
| 6,902,505 | B2 | 6/2005 | Yonezawa et al. |
| 6,913,552 | B2 | 7/2005 | Young |
| 7,014,585 | B2 | 3/2006 | Horikawa et al. |
| 7,479,077 | B2 | 1/2009 | Markley et al. |
| 7,513,843 | B2 | 4/2009 | Markley et al. |
| 7,641,577 | B2 | 1/2010 | Markley et al. |
| 7,691,018 | B2 | 4/2010 | Haesloop et al. |
| 8,715,122 | B2 | 5/2014 | Young et al. |
| 2002/0039941 | A1 | 4/2002 | Nakamura et al. |
| 2002/0045503 | A1 * | 4/2002 | Young et al. .................. 474/111 |
| 2002/0069539 | A1 | 6/2002 | Tada |
| 2002/0107097 | A1 | 8/2002 | Takeda |
| 2002/0142872 | A1 | 10/2002 | Tada |
| 2003/0064843 | A1 * | 4/2003 | Konno .......................... 474/111 |
| 2003/0125144 | A1 | 7/2003 | Horikawa et al. |
| 2004/0005953 | A1 | 1/2004 | Yonezawa et al. |
| 2004/0132570 | A1 | 7/2004 | Takeda |
| 2005/0090345 | A1 | 4/2005 | Garcia |
| 2006/0025256 | A1 | 2/2006 | Wake |
| 2006/0223661 | A1 | 10/2006 | Haesloop et al. |
| 2006/0234819 | A1 | 10/2006 | Markley et al. |
| 2007/0004544 | A1 | 1/2007 | Mishima |
| 2007/0037647 | A1 | 2/2007 | Markley et al. |
| 2009/0163311 | A1 | 6/2009 | Haesloop |
| 2010/0210384 | A1 * | 8/2010 | Young et al. .................. 474/111 |
| 2012/0035010 | A1 * | 2/2012 | Young ........................... 474/111 |
| 2012/0052997 | A1 * | 3/2012 | Young ........................... 474/111 |

OTHER PUBLICATIONS

Written Opinion mailed Mar. 7, 2014 for International Application No. PCT/US2013/073945.

International Preliminary Report on Patentability mailed Jun. 18, 2015 in International application No. PCT/US2013/073945.

* cited by examiner

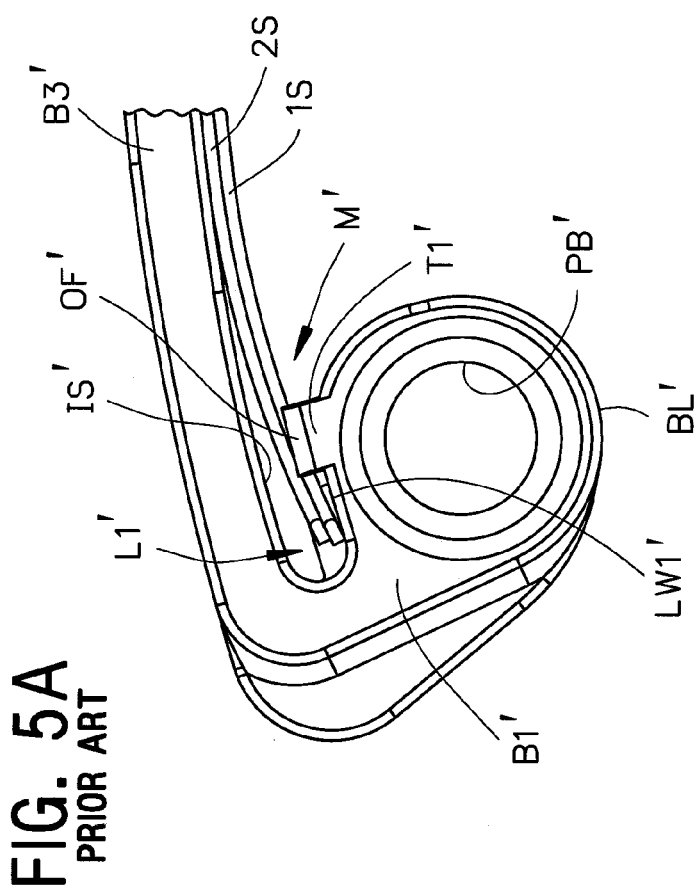
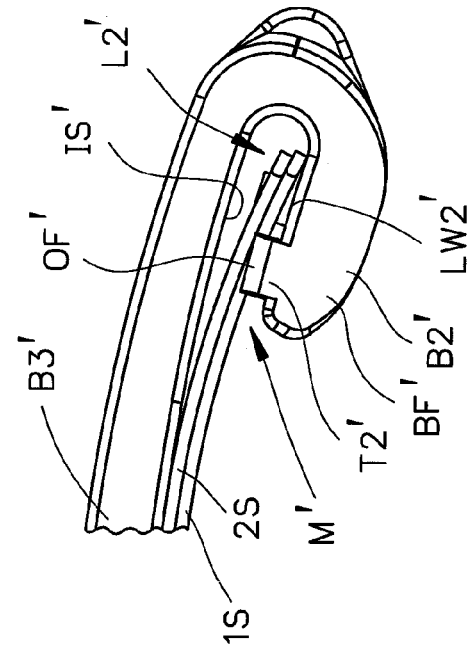
FIG. 5A PRIOR ART
FIG. 5B PRIOR ART

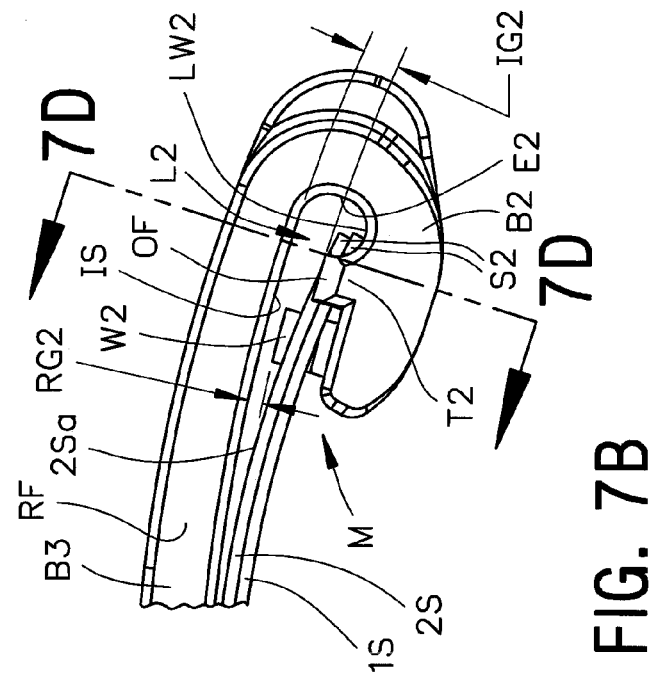
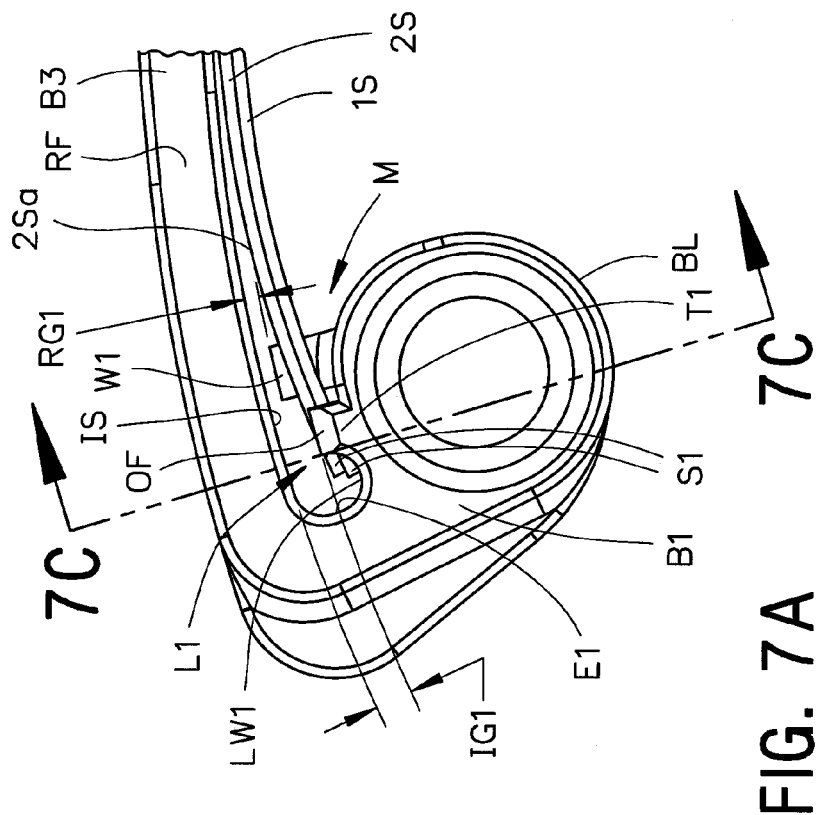
FIG. 7A
FIG. 7B

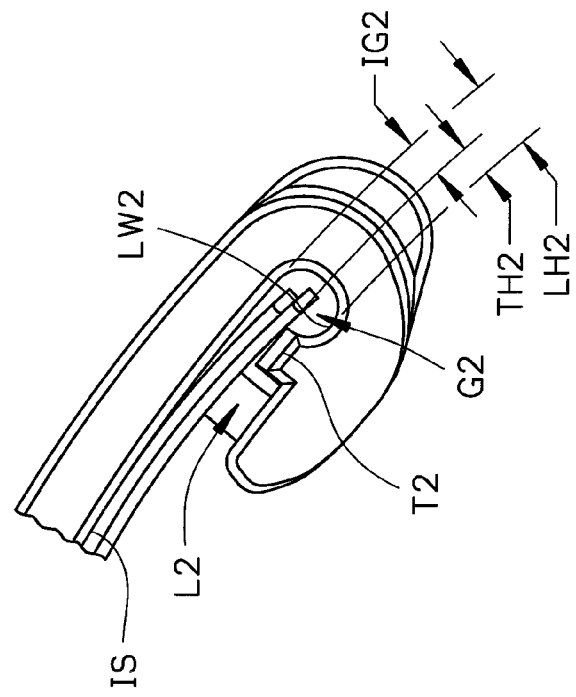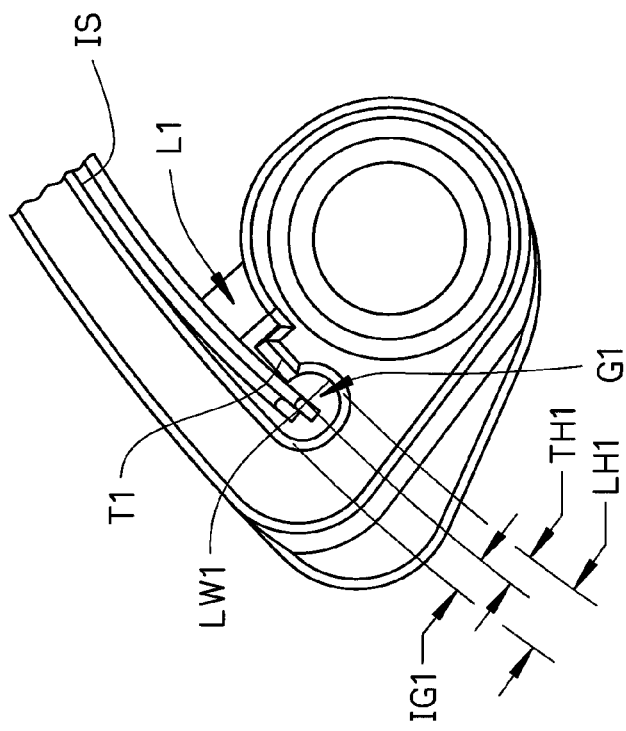

US 9,206,886 B2

CHAIN TENSIONER

CROSS-REFERENCE TO RELATED APPLICATION

This application claims priority from and benefit of the filing date of U.S. provisional patent application Ser. No. 61/735,028 filed Dec. 9, 2012, and the entire disclosure of said provisional application is hereby expressly incorporated by reference into the present specification.

BACKGROUND

The present invention relates generally to automotive chain drive systems and, more particularly, to a mechanical blade-type chain tensioner apparatus useful in confined spaces for applying a tensioning force to a chain traveling there past. Prior art blade-type chain tensioning devices include a chain engaging blade or shoe member, typically molded from a resinous plastic material, having a metal spring installed therein to provide the shoe sub-assembly with the necessary rigidity and damping characteristics while taking advantage of the flexibility, low friction, and good wear properties of the plastic shoe.

FIG. 1 shows an exemplary known tensioner apparatus T' comprising a bracket K typically defined from a metal stamping and a tensioner blade assembly BAS' operably connected to the bracket. The bracket K is fixedly secured to an associated engine block EB (FIG. 2) as part of a chain drive system that is provided to phase or "time" the rotational position of one or more camshaft sprockets CMS with respect to the rotational position of the crankshaft sprocket CKS. A chain 15 such as a roller/bush chain or inverted tooth chain is engaged with the crankshaft sprocket CKS and the camshaft sprocket(s) CMS and phases/times the camshaft sprocket(s) to the crankshaft sprocket. The crankshaft sprocket CKS rotates in a direction DIR, and the chain 15 includes a taut strand portion 16 and a slack strand portion 17.

In the illustrated embodiment, the known tensioner T' comprises an optional fixed chain guide portion FG including a fixed guide flange XF that projects transversely from the main wall MW of the bracket K and that is engaged with and supports a fixed chain guide G defined from a polymeric (plastic) material. The fixed chain guide G includes a guide face GF that slidably engages and supports the taut strand 16 of the chain as shown in FIG. 2.

The tensioner T' further comprises a tensioner portion TP' for tensioning the slack strand 17. As part of the tensioner portion TP', the bracket K comprises a pin P that is welded or otherwise securely affixed to the main wall MW and that projects perpendicularly outward therefrom. The bracket K further comprises a support flange TF that projects outwardly from the main wall MW. An end of the support flange TF forms or defines a ramp R, and an outer wall OW extends transversely from an outer end of the ramp R and extends parallel to the main wall MW such that a channel CH is defined between the main wall MW, the outer wall OW, and the ramp R.

The tensioner portion TP' includes the known tensioner blade assembly BAS' comprising a one-piece polymeric or "plastic" blade or shoe B' and a metal spring S releasably connected to the shoe B'. The spring S is typically formed as a leaf spring from a generally rectangular one-piece strip of spring steel that is formed to have an arched shape. A first or pivot end B1' of the shoe includes a boss or barrel BL' that includes pivot bore PB' that is slidably received onto the pivot pin P. The pivot pin P can be replaced by a shoulder bolt or any other suitable fastener that allows rotation of the pivot end B1' of the shoe B' relative to the bracket K. An opposite second or free end B2' of the shoe includes an enlarged foot BF' that is located in the channel CH and supported on the ramp R. The bracket K thus maintains the blade assembly BAS' in its proper position with respect to the plane of the chain path while permitting sliding reciprocal translational motion of the second, free end B2' on the ramp R as indicated by the arrow "TRANS" along with the related rotational movement of the blade assembly BAS' at the pivot end B1' as indicated by the arrow labeled "ROTATE" in response to changes in the tension and position of the slack strand 17 of the chain 15 and corresponding oscillatory movement of the slack strand 17 as indicated by the arrow "AMPL." FIG. 2A is a partial view of the tensioner T' that shows this operative movement of the blade assembly BAS' using solid lines for a first position of the blade assembly BAS' and phantom lines for a second position of the blade assembly BAS'.

FIG. 3 is a front (outside) view of the known tensioner blade assembly BAS' and FIG. 4 is a rear (inside) view of the blade assembly BAS'. FIGS. 3A and 3B are section views taken at lines 3A-3A and 3B-3B of FIG. 3, respectively. The first and second ends B1',B2' of the shoe define respective first and second spring-receiving slots L1',L2' for respectively receiving and retaining first and second opposite ends S1,S2 of the spring S. The shoe B' also includes a central portion B3' that extends between and interconnects the pivot and free ends B1',B2'. An upper or outer surface OS' of the central portion B3' provides a chain contact surface adapted for being slidably engaged by an associated chain being tensioned, and the chain moves on the outer surface OS' in a chain travel direction from the pivot end B1' toward the free end B2'. The central portion B3' includes a lower or inner surface IS' that is defined by the underside of the central portion B3' that is opposite the outer surface OS'. The inner surface IS' is contacted by an arched central portion S3 of the spring S.

As such, the first and second spring-receiving slots L1',L2' and the inner surface IS' of the shoe central portion B3' define a spring-receiving slot or region that opens through a front face FF' of the shoe B' and that also opens through a rear face RF' of the shoe. Each slot L1',L2' includes an open mouth M' (FIG. 4) oriented toward the mouth M' of the other slot L1',L2' through which the spring S extends toward the other slot L1',L2', i.e., the mouth M' of the first slot L1' opens toward the second slot L2' and the mouth of the second slot L2' opens toward the first slot L1'.

With particular reference to FIG. 3A, the first end S1 of the spring S is retained in the slot L1' between a first side wall W1' and a first installation tab T1'. The first side wall W1' is located adjacent the shoe front face FF' and abuts or lies closely adjacent an outer spring edge SE1. The first installation tab T1' is located adjacent the shoe rear face RF' and abuts or lies closely adjacent an inner spring edge SE2. The first spring end S1 is captured in the first spring-receiving slot L1' between the first side wall W1' and the first installation tab T1', with minimal clearance between the first spring end S1 and the first side wall W1' and the first installation tab T1' to minimize lateral movement of the first spring end S1 between the first side wall W1' and the first installation tab T1'. An outermost or distal tip of the first end S1 of the spring contacts a first lower wall LW1' of the slot L1' that is spaced from and faces the inner surface IS of the shoe central portion B3. Both the first side wall W1' and the first installation tab T1' are connected to and project outwardly from the lower wall LW1' of the slot L1' and both extend only partially or part-way toward the shoe central portion B3' such that space or gap is defined between the shoe central portion B3' and the outermost surface of both the first side wall W1' and the first installation tab T1'. In the exemplary embodiment, the lower wall LW1' is provided by an outer surface of the boss or barrel BL' in which the pivot bore PB' is defined.

Similarly, as shown in FIG. 3B, the second end S2 of the spring S is retained in the slot L2' between a second side wall W2' and a second installation tab T2'. The second side wall W2' is located adjacent the shoe front face FF' and abuts or lies closely adjacent the outer spring edge SE1. The second installation tab T2' is located adjacent the shoe rear face RF' and abuts or lies closely adjacent the inner spring edge SE2. The second end S2 of the spring S is captured in the slot L2' between the second side wall W2' and the second installation tab T2', with minimal clearance between the second spring end S2 and the second side wall W2' and the second installation tab T2' to prevent or at least minimize lateral movement of the second spring end S2 between the second side wall W2' and the second installation tab T2'. The second end S2 of the spring contacts a second lower wall LW2' of the slot L2' that is spaced from and faces the inner surface IS' of the shoe central portion B3'. Both the second side wall W2' and the second installation tab T2' are connected to a project outwardly or upwardly from the lower wall LW2', and each extends only partially or part-way toward the shoe central portion B3' such that space is defined between the shoe central portion B3' and both the second side wall W1' and the second installation tab T1'.

With continuing reference to FIGS. 3A and 3B, it can be seen that the first and second installation tabs T1',T2' each comprise an upper or outer face OF' that is generally oriented toward and spaced from the inner surface IS' of the shoe central portion B3'. Each outer face OF' is dimensioned and conformed to facilitate sliding insertion of the spring S there over between itself and the shoe inner surface IS' during sliding movement of the spring S into the slots L1',L2'. In the illustrated example, the respective outer faces OF' each comprise an inclined face IF' that begins adjacent the rear face RF' of the shoe B' and that extends closer to the inner surface IS' as it extends inwardly away from the rear face RF' toward the front face FF' of the shoe B'. The respective outer faces OF' each further comprise a flat face FT' that connects the inclined faces IF to respective lock faces LF' that lie transverse to the flat face FT'. The transverse lock faces LF' connect the innermost end of the flat faces FT' to the respective lower walls LW1',LW2'. The lock faces LF' are respectively oriented toward the first and second side walls W1',W2' located on the opposite sides of the slots L1',L2', such that the installed spring end S1 is captured between the first side wall W1' and the lock face LF' of the first locking tab T1', and the spring end S2 is captured between the second side wall W2' and the lock face LF' of the second locking tab T2'.

Between the first and second slots L1',L2', the shoe B' is completely open through both the front face FF' and rear face RF' of the shoe B'. It has been deemed beneficial to eliminate all spring-retaining walls or tabs that extend from the inner surface IS' of the shoe central portion B3', as these walls/tabs can create stress risers due to the flexing of the shoe central portion during engine operation. As such, the spring S must be contained in the slots L1',L2' by only the installation tabs T1',T2' and walls W1',W2'.

To assemble the blade assembly BAS', the shoe B is resiliently deformed to decrease the radius of the outer surface OS' by decreasing the distance between the first and second shoe ends B1',B2', which causes the spring-receiving region to temporarily assume a shape that approximates the free (undeflected) shape of the spring S. The first and second spring ends S1,S2 are then inserted simultaneously into the first and second spring-receiving slots L1',L2', respectively, by insertion through the spaces defined between the first and second installation tabs T1',T2' and the inner surface IS' at the rear face RF' of the shoe (the spring S is optionally also resiliently deformed during this installation process). When the spring S is fully received in the first and second slots L1',L2', the spring S and shoe B' are allowed to relax such that the spring is captured in the spring-receiving region as described above. In order to accomplish this spring installation process, the height of the installation tabs T1',T2' must be limited to ensure sufficient space between the tabs T1',T2' and the inner surface IS'.

It is generally a preferred solution to use a single-spring S for a blade tensioner where the single-spring tensioner properly controls chain strand vibration over the operating range of the engine and the specified wear life (chain wear take-up) of the tensioner. The excessive dynamics of some engine camshaft drives, however, require the known advantages of a multiple-spring tensioner, i.e., a tensioner including two (or more) metal springs S arranged in a stacked, nested configuration and connected to the plastic shoe as described above to provide the required tensioning load and resilient biasing properties.

Known chain tensioner shoes such as the shoe B' described above can be deficient with respect to retention of multiple springs in the slots L1',L2' under certain conditions. As noted, the height of the installation tabs T1',T2' must be limited to allow the spring(s) S to be installed through the gaps defined respectively between the installation tabs T1',T2' and the inner surface IS', and this height limitation decreases the ability of the installation tabs T1',T2' to retain more than one installed spring S. Furthermore, the first and second installation tabs T1',T2' must be offset in terms of the chain travel direction axis from the first and second side walls W1',W2', respectively, in order to manufacture the shoe B' efficiently in a typical injection molding process. This means that, for each slot L1',L2', either its installation tab T1',T2' or its side wall W1',W2' must be located closer to the open mouth M' (see FIGS. 5, 5A, 5B) of the slot L1',L2', i.e., closer to the other slot L1',L2' and closer to the midpoint between the opposite ends B1',B2' of the shoe, and this position is referred to herein as the "inboard" position. For the known tensioner shoe B' shown herein, the first and second installation tabs T1',T2' are each located in the inboard position, and the first and second side walls W1',W2' are each in the outboard position, i.e., the first and second side walls W1',W2' are located a greater distance from the open mouth M' of the respective slots L1', L2' and a greater distance from the midpoint between the opposite ends B1',B2' of the shoe B' as compared to the inboard tabs T1',T2'. The distance between the inboard first and second installation tabs T1',T2' is less that the distance between the outboard first and second side walls W1',W2'.

FIG. 5 shows the known shoe B' with first and second springs S (1S,2S) arranged in a stacked, nested relationship and installed in the slots L1',L2'. FIGS. 5A and 5B provide greatly enlarged views of the opposite ends B1',B2' of the shoe B', and it can be seen that second (outer) spring 2S located closest to the inner surface IS' of the central portion B3' is not sufficiently overlapped and retained by either installation tab T1',T2'. As noted, this is due to the required height limitation the installation tabs T1',T2' to allow the spring(s) S to be installed thereover, in combination with the fact that the installation tabs T1',T2' are the inboard tabs located where the arched springs 1S,2S are spaced a greater distance from the lower walls LW1',LW2' of the respective slots L1',L2' as compared to the position of the springs 1S,2S adjacent the outer walls W1',W2'. In other words, the outer walls W1',W2' are respectively located adjacent the opposite distal ends of the springs 1S,2S where the springs contact the lower walls LW1',LW2' which enables the outer walls W1',W2' to capture the springs 1S,2S, while the inboard installation tabs T1',T2', which are necessarily limited in height above the lower walls LW1',LW2', are unable to capture the arched portion of the second spring 2S that is spaced away from the respective lower wall LW1',LW2'. As such, the second spring 2S is at risk of becoming dislodged from either or both slots L1',L2' which could allow the spring 2S to contact and undesirably engage the bracket wall MW or to become separated from and/or damage the shoe B'.

SUMMARY

In accordance with one aspect of the present development, a chain tensioner blade assembly includes a polymeric shoe comprising a first end, a second end, and a central portion that extends between the first end and the second end. The central portion comprises: (i) an outer surface adapted for being slidably engaged by an associated chain; and, (ii) an inner surface located on an opposite side of said central portion relative to the outer surface. A pivot bore is defined in the first end of the shoe. A first spring-receiving slot is located in the first end of the shoe and a second spring-receiving slot located in the second end of the shoe. The first spring-receiving slot includes an open mouth oriented toward the second spring-receiving slot, and the second spring-receiving slot includes an open mouth oriented toward the first spring-receiving slot. The first spring-receiving slot, the said second spring-receiving slot, and the inner surface of the shoe provide a spring-receiving region. The first spring-receiving slot includes: (i) a first lower wall that is spaced from and faces the inner surface of the shoe central portion; (ii) a first side wall connected to and projecting outwardly from the first lower wall and extending, toward, but not connected to, the inner surface so that a first spring retention gap is defined between the first side wall and the inner surface; (iii) a first installation tab connected to the first lower wall, the first installation tab extending toward, but not connected to, the inner surface of the shoe central portion such that a first spring insertion gap is defined between the first installation tab and the inner surface. A minimum magnitude of the first spring retention gap is smaller than a minimum magnitude of the first spring insertion gap. The A second spring-receiving slot comprises: (i) a second lower wall that is spaced from and faces the inner surface of the shoe central portion; (ii) a second side wall connected to and projecting outwardly from the second lower wall and extending toward, but not connected to, the inner surface so that a second spring retention gap is defined between the second side wall and the inner surface; (iii) a second installation tab connected to the second lower wall, the second installation tab extending toward, but not connected to, the inner surface of the shoe central portion such that a second spring insertion gap is defined between the second installation tab and the inner surface. A minimum magnitude of the second spring retention gap is smaller than a minimum magnitude of the second spring insertion gap. A spring stack comprising at least a first leaf spring located in the spring-receiving region of the shoe. The spring stack comprises: (i) a first end located in the first spring-receiving slot between the first side wall and the first installation tab; (ii) a second end located in the second spring-receiving slot between the second side wall and the second installation tab; (iii) a central portion located between and connecting said first and second spring ends, the central portion of said stack of springs includes an outer surface in contact with the inner surface of the shoe central portion. The first and second installation tabs are located in an outboard position relative to the first and second side walls such that the first and second installation tabs are spaced farther apart from each other as compared to said first and second side walls and farther from a midpoint of the shoe located between said first and second ends of the shoe as compared to the first and second side walls. Each of the first and second side walls and each of said first and second installation tabs extends toward the inner surface of the shoe central portion sufficiently such that at least part of each of the first and second side walls and at least part of each of the first and second installation tabs is flush with or extends beyond the outer surface of the stack of springs.

In accordance with another aspect of the present development, a chain tensioner includes a bracket comprising: (i) a main wall; (ii) a pivot pin projecting outwardly from the main wall; and, (iii) a ramp that extends outwardly from the main wall. The chain tensioner also includes a tensioner blade assembly operatively connected to the bracket. The tensioner blade assembly includes a polymeric shoe comprising a first end, a second end, and a central portion that extends between the first end and the second end, the central portion comprising: (i) an outer surface adapted for sliding movement of an associated chain thereon; and, (ii) an inner surface located on an opposite side of the central portion relative to the outer surface. A pivot bore is defined in the first end of the shoe. The pivot pin is received in the pivot bore and the second end of the shoe is supported on the ramp. The first end of the shoe includes a first spring receiving slot and the second end of the shoe includes a second spring receiving slot. The first spring receiving slot includes an open mouth oriented toward the second spring receiving slot, and the second spring receiving slot includes an open mouth oriented toward the first spring receiving slot. The first spring receiving slot, the second spring-receiving slot, and the inner surface of the shoe provide a spring-receiving region. The first spring receiving slot includes: (i) a first lower wall that is spaced from and faces the inner surface of the shoe central portion; (ii) a first side wall connected to and projecting outwardly from the first lower wall, extending part-way toward, but not connected to, the inner surface; (iii) a first installation tab connected to the first lower wall, the first installation tab extending only partially toward and spaced from the inner surface of the shoe central portion, and the first installation tab having a reduced height above the first lower wall as compared to the first side wall. The first installation tab located in an outboard position where it is located farther from the open mouth of the first spring receiving slot as compared to the first side wall. The second spring receiving slot includes: (i) a second lower wall that is spaced from and faces the inner surface of the shoe central portion; (ii) a second side wall connected to and projecting outwardly from the second lower wall, extending part-way toward, but not connected to, the inner surface; (iii) a second installation tab connected to the second lower wall, the second installation tab extending only partially toward and spaced from the said inner surface of the shoe central portion, the second installation tab having a reduced height above the second lower wall as compared to the second side wall, and the second installation tab located in an outboard position where it is located farther from the open mouth of the second spring receiving slot as compared to the second side wall. The tensioner blade assembly further includes a spring stack comprising at least one leaf spring located in the spring receiving region, the spring stack comprising: (i) a first end located in the first spring receiving slot between the first side wall and the first installation tab; (ii) a second end located in the second spring receiving slot between the second side wall and the second installation tab; and, (iii) a central portion located between the first end and the second end, wherein the central portion of the spring stack includes an outer surface in contact with the inner surface of the shoe central portion. The first and second installation tabs and the first and second side walls extend respectively outward from said first and second lower walls to respective heights where at least part of each of the first and second installation tabs and at least part of each of the first and second side walls are flush with or extend above the outer surface of the spring stack to capture the spring stack in the spring receiving region.

BRIEF DESCRIPTION OF THE DRAWINGS

FIGS. 5A and 5B (prior art) provide greatly enlarged views of the opposite ends of the polymeric shoe and multiple installed springs of FIG. 5;

FIGS. 7A and 7B are respective greatly enlarged views of the first and second ends of the tensioner blade assembly of FIG. 7;

FIGS. 11A and 11B are respective greatly enlarged views of the first and second ends of the tensioner blade assembly of FIG. 11.

DETAILED DESCRIPTION OF NEW DEVELOPMENT

Figure 1:
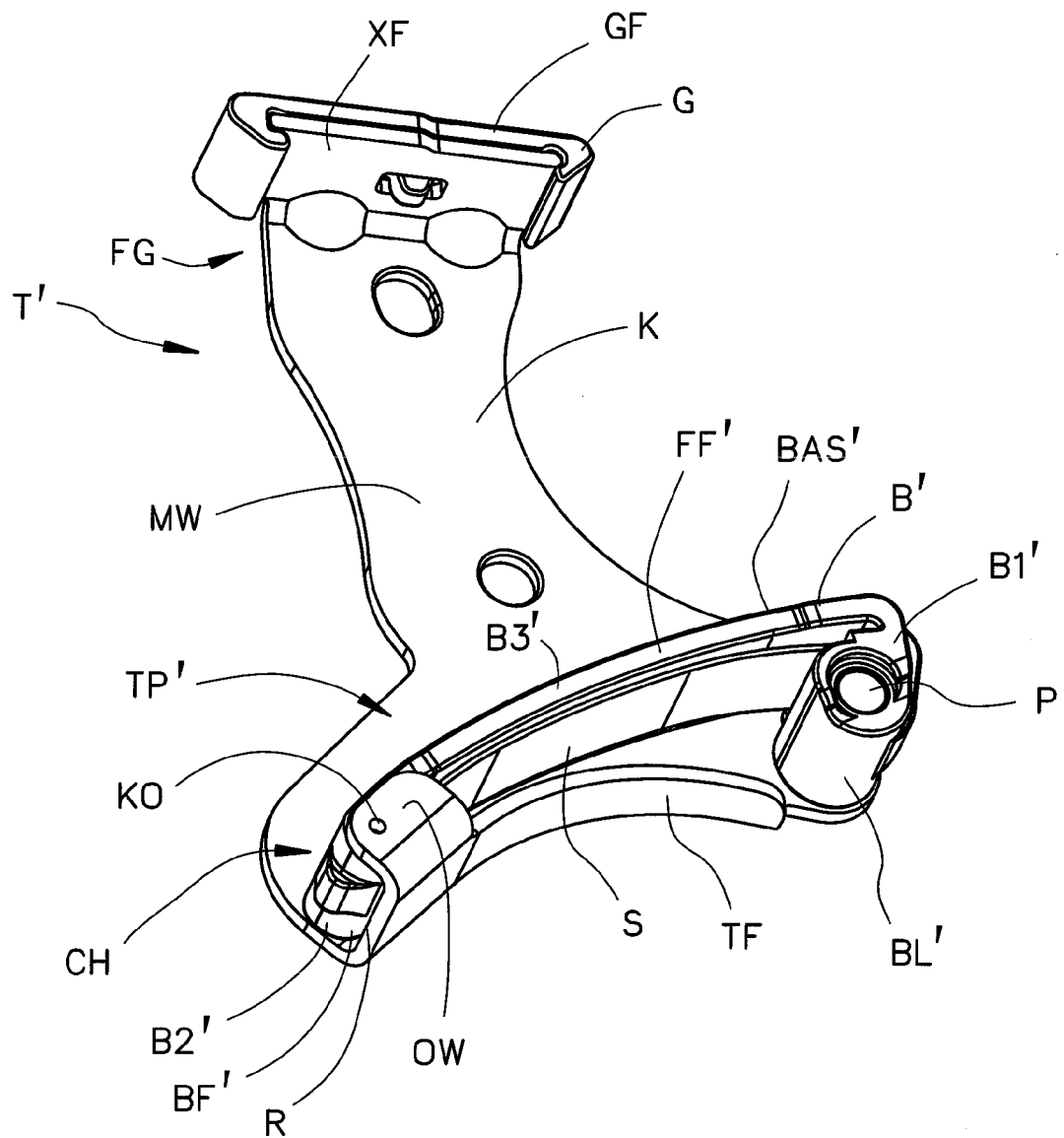
FIG. 1 (prior art) shows an exemplary known chain tensioner apparatus comprising a bracket defined from a metal stamping and a tensioner blade assembly operably connected to the bracket.
Figure 2:
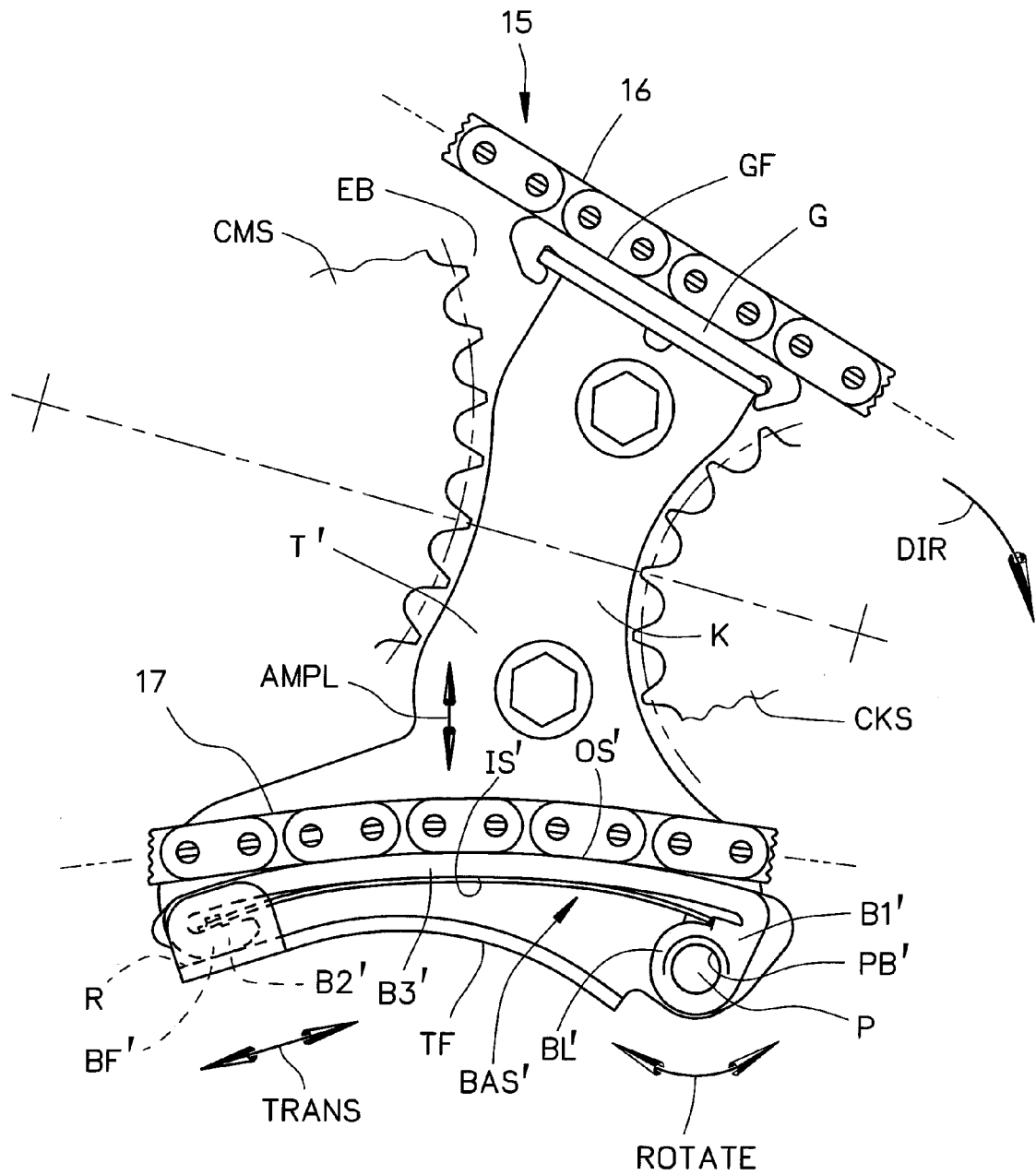
FIG. 2 (prior art) shows the known chain tensioner apparatus of FIG. 1 operatively installed as part of an internal combustion engine to tension an associated chain drivingly engaged with a crankshaft sprocket and one or more camshaft sprockets.
Figure 2A:
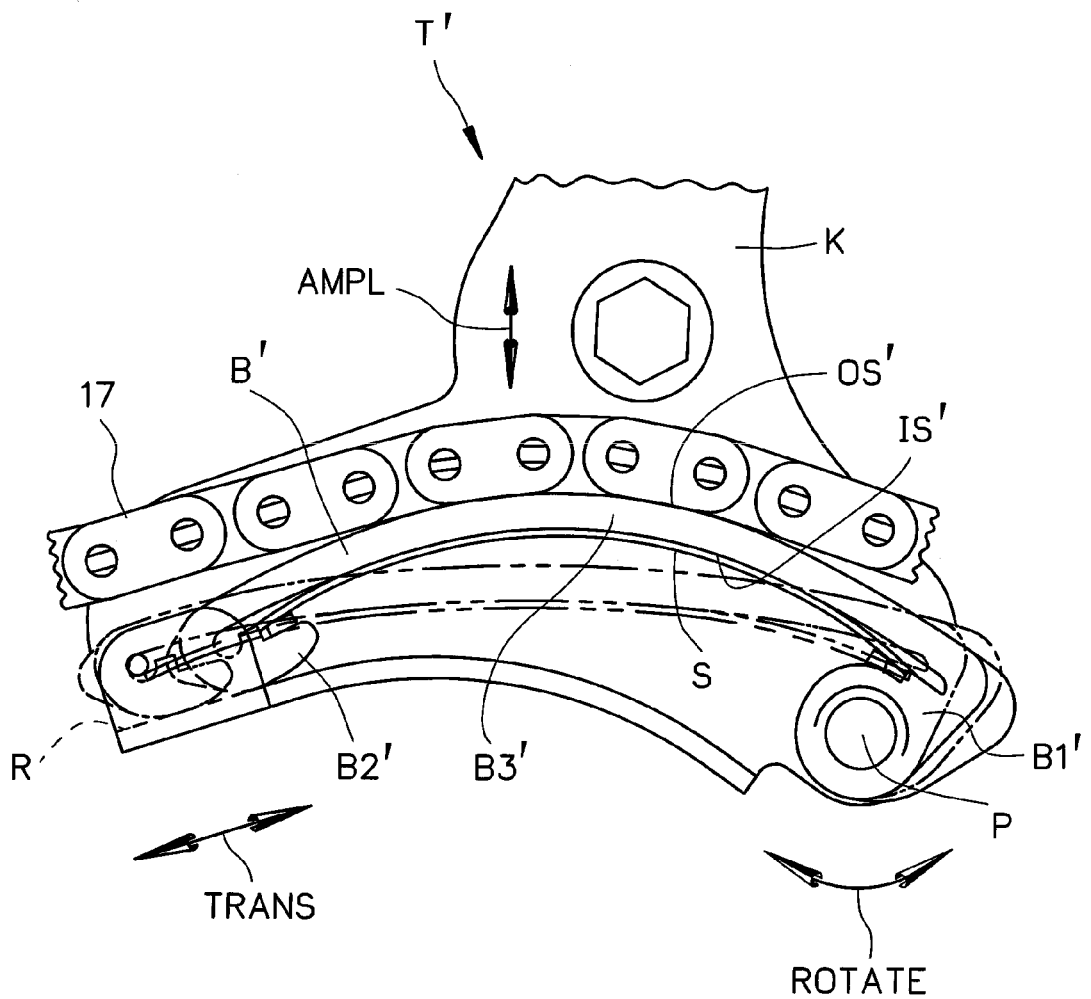
FIG. 2A (prior art) is a partial view of the tensioner of FIG. 1 showing its operative movement during use.
Figure 3:
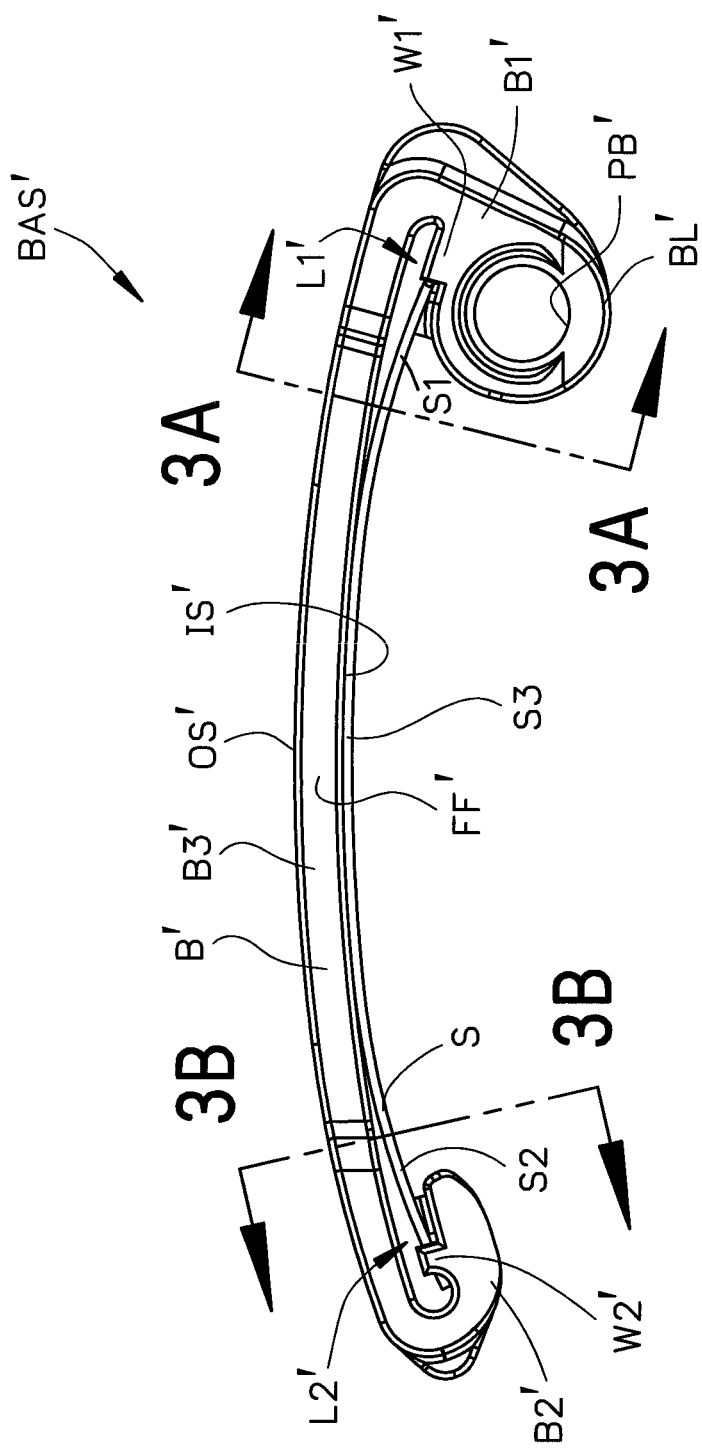
FIG. 3 (prior art) is a front (outside) view of the known tensioner blade assembly of the chain tensioner apparatus of FIG. 1.
Figure 3A:
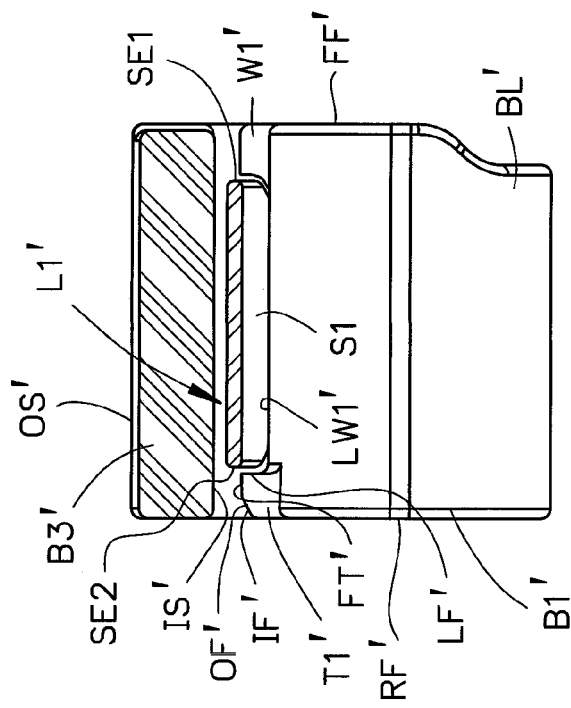
FIGS. 3A and 3B (prior art) are section views taken at lines 3A-3A and 3B-3B of FIG. 3, respectively.
Figure 3B:
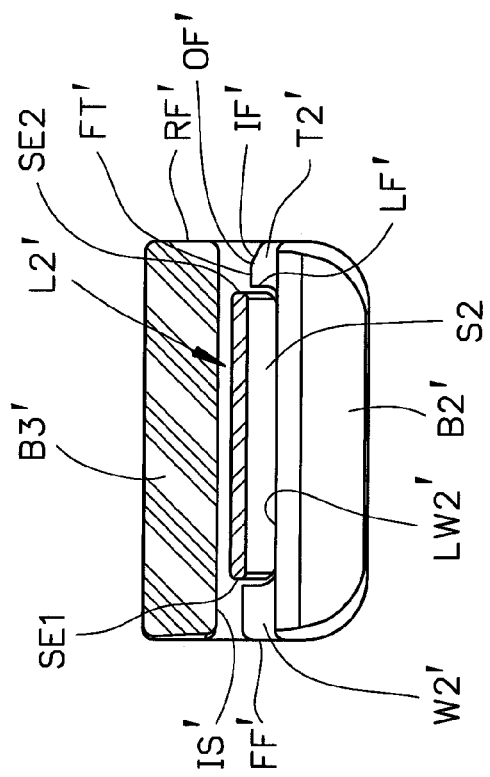
Figure 4:
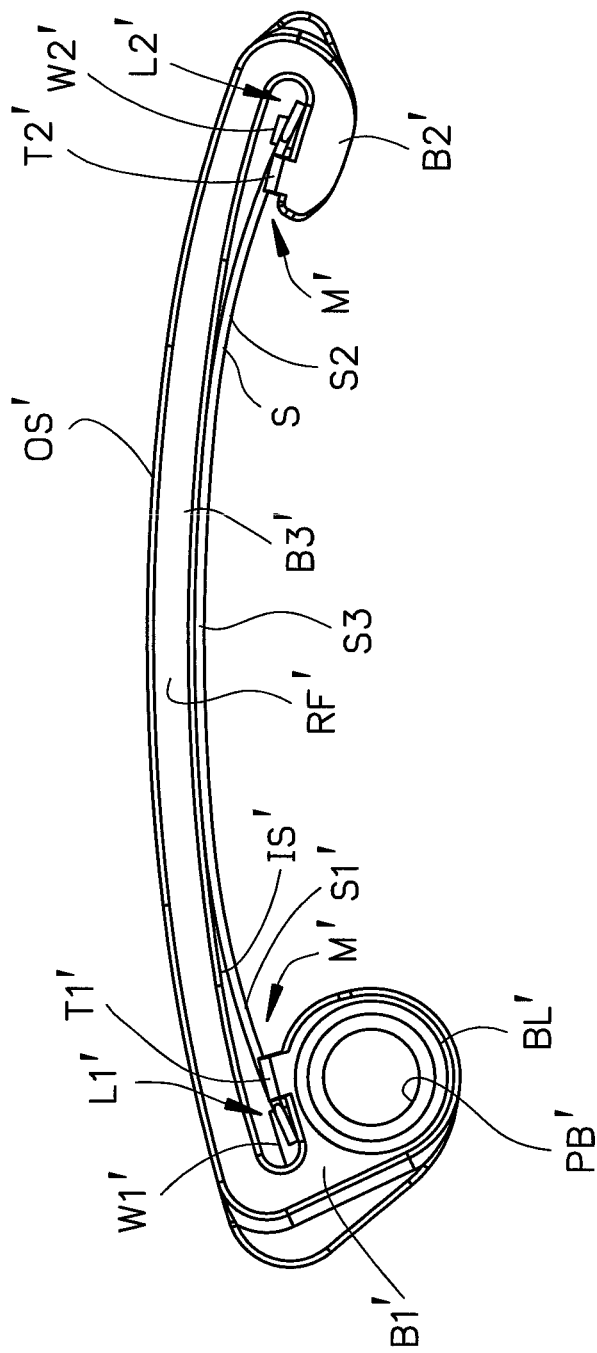
FIG. 4 (prior art) is a rear (inside) view of the known tensioner blade assembly of the chain tensioner apparatus of FIG. 1.
Figure 5:
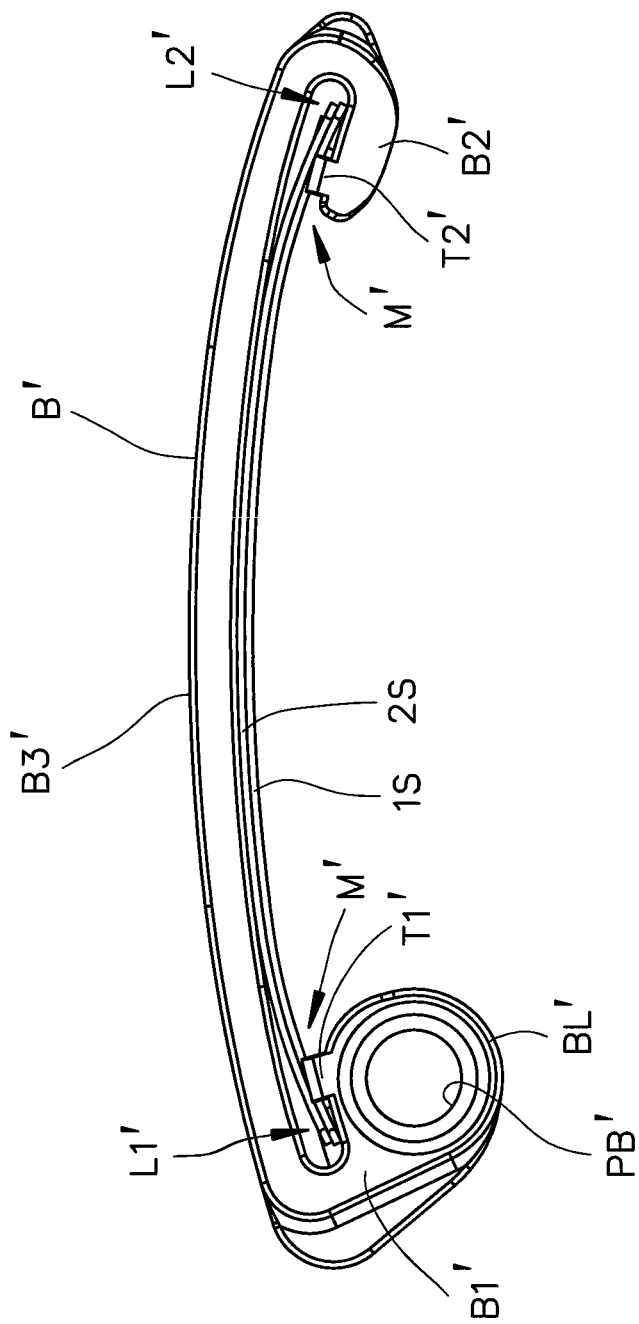
FIG. 5 (prior art) shows the known polymeric shoe of the tensioner blade assembly of FIGS. 1-4, with first and second springs arranged in a stacked, nested relationship and operatively installed.
Figure 6:
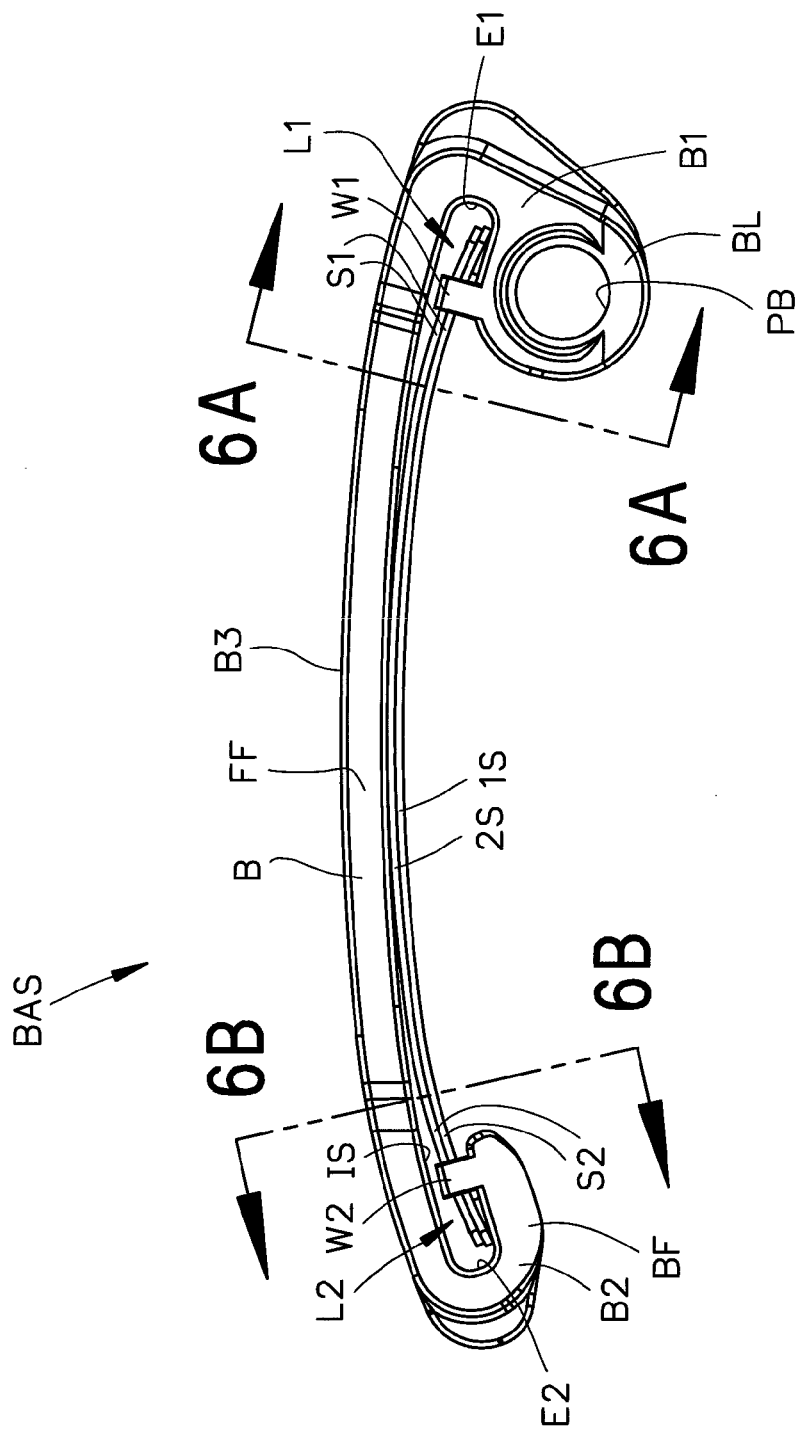
FIGS. 6 and 7 are respective front (outside) and rear (inside) views of a tensioner blade assembly comprising a polymeric shoe formed according to the present development, and including first and second stacked/nested springs operatively installed and effectively retained.
Figure 7:
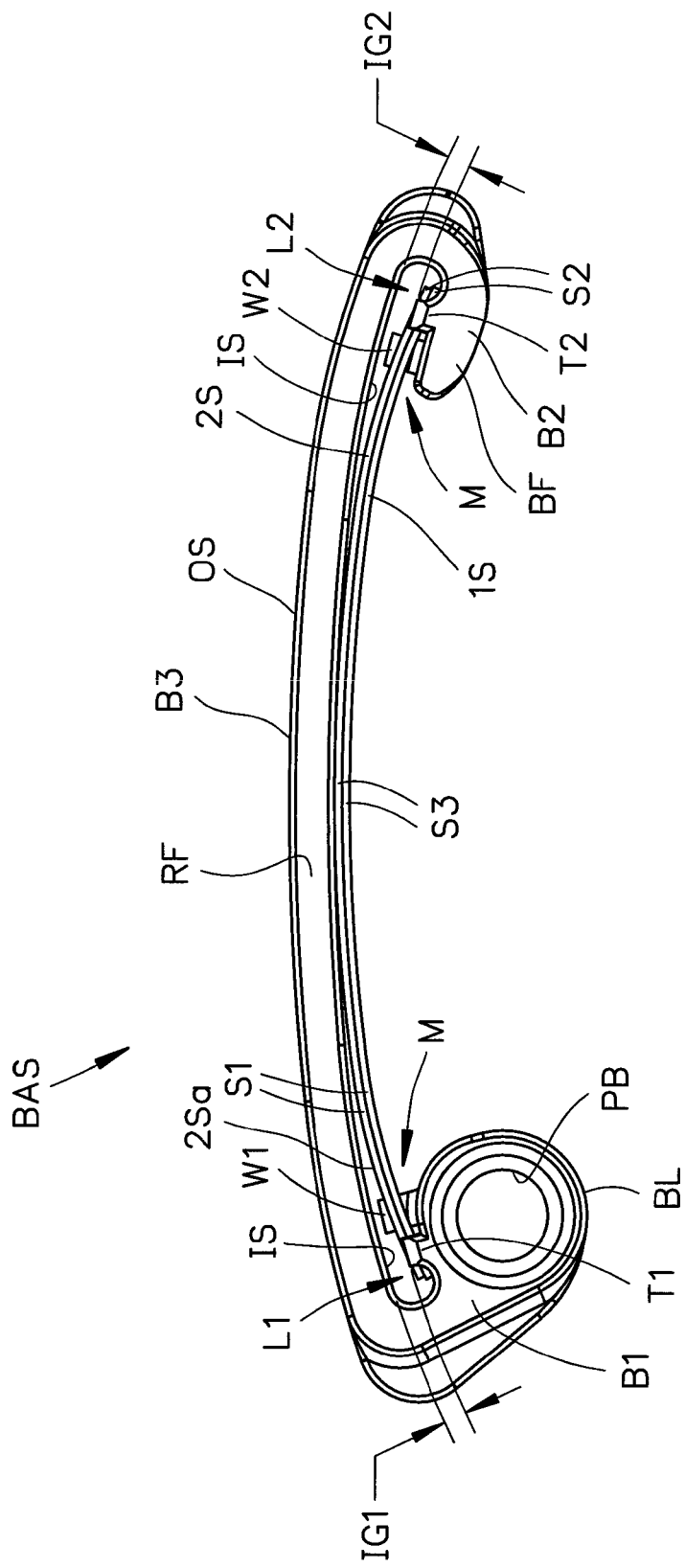

According to the present development as described with reference to FIGS. 6-11B, a new and improved chain tensioner shoe B comprises installation tabs and retaining features to constrain a stack of one or more springs in the shoe while still permitting installation of the spring(s) into the shoe using conventional methods. FIGS. 6 and 7 are respective front (outside) and rear (inside) views of a tensioner blade assembly BAS comprising a shoe B formed according to the present development, and including first and second leaf springs S (1S,2S) operatively installed. As noted above, a single spring S can be used in the tensioner blade assembly BAS instead of two or more springs 1S,2S without departing from the scope and intent of the present development, but the tensioner blade assembly is described herein with reference to an exemplary embodiment comprising a stack of two springs 1S,2S. Similar components and features of the shoe B relative to the shoe B' described above are identified with like reference letters and numbers that omit the primed (') designation. The springs S (1S,2S) are similar or identical to the springs S (1S,2S) described above in relation to FIGS. 1-5, but the shoe B is modified relative to the shoe B' as described and/or shown herein in order to provide for effective installation and retention of both the first and second springs 1S,2S. The blade assembly BAS is installed on the bracket K of FIGS. 1-2A or another bracket in the same manner described above for the known blade assembly BAS' with its rear face RF oriented toward and located adjacent the main wall MW of the bracket K to provide a chain tensioner that functions similarly to the chain tensioner T', or the blade assembly BAS can be pivotally mounted directly or indirectly to an engine or other structure in an alternative arrangement (e.g., using a shoulder bolt or other pin or fastener inserted through the pivot bore PB) to tension an associated chain moving on its outer surface OS.

The blade assembly BAS includes a one-piece polymeric or "plastic" blade or shoe B and multiple metal springs S such as first and second springs 1S,2S releasably connected to the shoe B. The springs S are each typically formed from a generally rectangular one-piece strip of spring steel that is formed to have an arched shape, and the springs 1S,2S are arranged in a stacked, nested configuration to form a stack of springs. A first or pivot end B1 of the shoe includes a boss or barrel BL that includes the pivot bore PB that is slidably received onto the bracket pivot pin P (FIGS. 1-2A) or through which a shoulder bolt or other pivot fastener or pin is inserted to directly or indirectly mount the blade assembly BAS to an associated engine. The shoe B includes an opposite second or free end B2 that comprises a foot BF that is adapted to be located in the channel CH and slidably supported on the ramp R of the associated bracket K or other mounting structure.

Figure 6A:
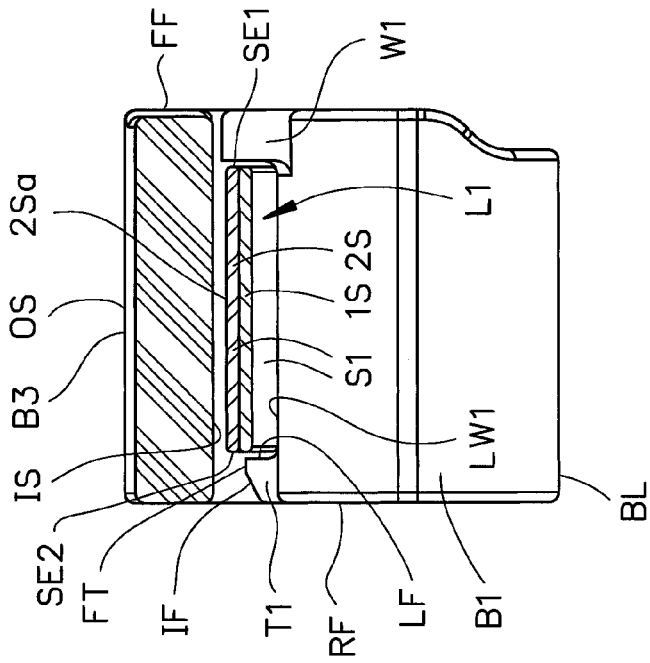
FIGS. 6A and 6B are section views taken at lines 6A-6A and 6B-6B of FIG. 6, respectively.
Figure 6B:
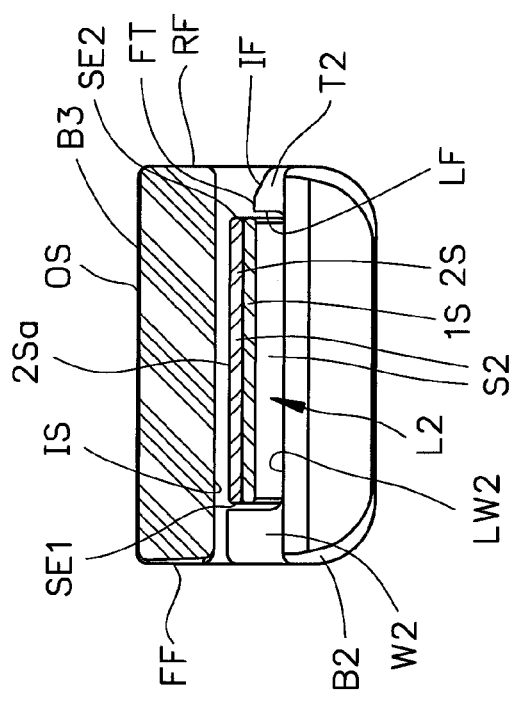

FIGS. 6A and 6B are section views taken at lines 6A-6A and 6B-6B of FIG. 6, respectively. The springs 1S,2S are stacked and nested together, and the first and second ends B1,B2 of the shoe B define respective first and second spring-receiving slots L1,L2 for respectively receiving a retaining first and second opposite ends S1,S2 of each spring 1S,2S, i.e., for respectively receiving and retaining the first and second opposite ends of the stack of springs. The shoe B also includes a central portion B3 that extends between and interconnects the pivot and free ends B1,B2. An upper or outer surface OS of the central portion B3 provides a chain contact surface adapted for being slidably engaged by an associated chain being tensioned, and the chain moves on the outer surface OS in a chain travel direction from the pivot end B1 toward the free end B2. The central portion B3 includes a lower or inner surface IS that is defined by the underside of the central portion B3 that is opposite the outer surface OS. The inner surface IS is contacted by an arched central portion S3 of the stack of springs S1,S2. In particular, the inner surface IS of the blade central portion B3 is contacted by an exposed, outer surface 2Sa of the single spring S or the outermost spring 2S in the case of a stack of multiple springs as shown herein. The outer surface 2Sa of the stack of springs will always be the surface of the single spring 1S or 2S or outermost spring of the stack of springs 1S,2S that is in contact with the inner surface IS of the blade central portion B3. As such, the first and second spring-receiving slots L1,L2 and the inner surface IS of the shoe central portion B3 define a spring-receiving slot or region that opens through a rear face RF of the shoe B and that also opens through a front face FF of the shoe.

With particular reference to FIGS. 6 and 6A, the first end S1 of each spring 1S,2S (or either one of springs 1S or 2S if only a single spring is installed) is retained in the slot L1 between a first side wall W1 and a first installation tab T1 such that the first end of the stack of springs 1S,2S is received and retained in the first slot L1 between the first side wall W1 and the first installation tab T1. The first side wall W1 is located adjacent the shoe front face FF and abuts or lies closely adjacent the outer edges SE1 of the springs 1S,2S. The first installation tab T1 is located adjacent the shoe rear face RF and abuts or lies closely adjacent the inner spring edge SE2. Accordingly, the first end S1 of each spring 1S,2S is captured in the first spring-receiving slot L1 between the first side wall W1 and the first installation tab T1, with minimal clearance between each first spring end S1 and the first side wall W1 and the first installation tab T1 to restrict lateral movement of the first end S1 of each spring 1S,2S between the first side wall W1 and the first installation tab T1. An outermost or distal tip of the first end S1 of at least the first spring 1S contacts a floor or lower wall LW1 of the slot L1 that is spaced from and faces the inner surface IS of the shoe central portion B3. Both the first side wall W1 and the first installation tab T1 are connected to and project outwardly from the lower wall LW1 of the slot L1 and both extend only partially or part-way toward the shoe central portion B3 such that space is defined between the shoe central portion B3 and both the first side wall W1 and the first installation tab T1. In the exemplary embodiment, the lower wall LW1 is provided by an outer surface of the boss or barrel BL in which the pivot bore PB is defined. The first side wall W1 extends higher above the lower wall LW1 than the first installation tab T1, because the first installation tab T1 must be limited in height so that the arched springs 1S,2S can be installed over the first installation tab T1 into the slot L1. Neither the first installation tab T1 nor the first side wall W1 are connected to the inner surface IS of the shoe central portion B3, because the springs 1S,2S must be installed in the slot L1 through a first spring insertion gap IG1 (see FIG. 7) defined between the first installation tab T1 and the inner surface IS, and connection of the first side wall W1 to the inner surface IS would create a stress riser and limit flexibility of the shoe central portion B3.

Similarly, as shown in FIG. 6B, the second end S2 of each spring 1S,2S (or either one of springs 1S or 2S if only a single spring is installed) is retained in the slot L2 between a second side wall W2 and a second installation tab T2 such that the second end of the stack of springs 1S,2S is received and retained in the second slot L2 between the second side wall W2 and the second installation tab T2. The second side wall W2 is located adjacent the shoe front face FF and abuts or lies closely adjacent the outer spring edge SE1. The second installation tab. T2 is located adjacent the shoe rear face RF and abuts or lies closely adjacent the inner spring edge SE2. The second end S2 of each spring S is thus captured in the slot L2 between the second side wall W2 and the second installation tab T2, with minimal clearance between each second spring end S2 and the second side wall W2 and the second installation tab T2 to prevent or at least minimize lateral movement of the second spring end S2 between the second side wall W2 and the second installation tab T2. The outermost or distal tip of the second end S2 of at least the first spring 1S contacts a second lower wall LW2 of the second slot L2 that is spaced from and faces the inner surface IS of the shoe central portion B3. Both the second side wall W2 and the second installation tab T2 are connected to a project outwardly or upwardly from the second lower wall LW2, and each extends only partially or part-way toward the shoe central portion B3. The second side wall W2 extends higher above the lower wall LW2 than the second installation tab T2, because the second installation tab T2 must be limited in height so that the springs 1S,2S can be installed over the second installation tab T2 into the slot L2. Neither the second installation tab T2 nor the second side wall W2 are connected to the inner surface IS of the shoe central portion B3, because the springs 1S,2S must be installed in the slot L2 through a second spring insertion gap IG2 (see FIG. 7) defined between the second installation tab T2 and the inner surface IS, and connection of the second side wall W2 to the inner surface IS would create a stress riser and limit flexibility of the shoe central portion B3.

With reference also to FIGS. 7A-7D, it can be seen that the first and second installation tabs T1,T2 each comprise an upper or outer face OF that is generally oriented toward and spaced from the inner surface IS of the shoe central portion B3. Each outer face OF is dimensioned and conformed to facilitate sliding insertion of the stacked and nested springs 1S,2S there over between itself and the shoe inner surface IS during sliding movement of the springs 1S,2S into the slots L1,L2 through the respective spring insertion gaps IG1,1G2. In the illustrated example, the respective outer faces OF each comprise an inclined face IF that begins adjacent the rear face RF of the shoe B and that extends closer to the inner surface IS as it extends inwardly away from the rear face RF toward the front face FF of the shoe B. The outer faces OF each further comprise a flat transition face FT that connects the respective inclined faces IF to respective lock faces LF (FIGS. 6A,6B) that lie transverse to the flat face FT. Each transition face FT includes a first end connected to the respective inclined face IF and includes a second end connected to the respective transverse lock face LF. The lock face connects with the respective transition face FT at a right angle. The transverse lock faces LF connect the innermost end of the flat faces FT to the respective lower walls LW1,LW2. The lock faces LF are respectively oriented toward the first and second side walls W1,W2 located on the opposite sides of the slots L1,L2, such that each installed spring end S1 is captured between the first side wall W1 and the lock face LF of the first locking tab T1, and each spring end S2 is captured between the second side wall W2 and the lock face LF of the second locking tab T2.

In the central region B3 located between the first and second slots L1,L2, the shoe B is completely open through both the front face FF and rear face RF of the shoe B. Each slot L1,L2 includes an open mouth M (FIG. 7) oriented toward the other slot L1,L2 through which the spring S extends toward the other slot L1,L2. It has been deemed beneficial to eliminate all spring-retaining walls or tabs that extend from the inner surface IS of the shoe central portion B3, as these walls/tabs can create stress risers due to the flexing of the shoe central portion during engine operation. As such, the springs 1S,2S must be laterally contained in the slots L1,L2 solely by the installation tabs T1,T2 and walls W1,W2.

The shoe B is intended to retain a stack of multiple springs 1S,2S in the slots L1,L2 as shown herein, but can be used with a stack of only one of the springs 1S,2S installed, i.e., the stack of springs S can include only a single spring 1S or 2S or can include two or more springs such as both springs 1S and 2S as shown herein. As noted, the height of the installation tabs T1,T2 above the respective lower walls LW1,LW2 must necessarily be limited to allow the one or more springs 1S,2S to be installed through the spring insertion gaps IG1,IG2 defined respectively between the installation tabs T1,T2 and the inner surface IS. In contrast, the height of the first and second side walls W1,W2 above the respective lower walls LW1,LW2 can be much greater as compared to the installation tabs T1,T2 because the springs 1S,2S are never required to pass through the respective spring retention gaps RG1,RG2 defined between these walls W1,W2 and the inner surface IS. The spring insertion gaps IG1,IG2 and spring retention gaps RG1,RG2 are measured normal to the inner surface IS of the shoe central portion B3, and the minimum magnitude of each first and second spring retention gap RG1,RG2 are always less than the minimum magnitude of the first and second spring insertion gap IG1,IG2, respectively. According to the present development, the first and second side walls W1,W2 are located in the inboard position, i.e., closer to the open mouth M of the respective slot L1,L2 in which they are located as compared to the first and second installation tabs T1,T2. This structural arrangement locates the first and second side walls W1,W2 closer to the midpoint between the first and second ends B1,B2 of the shoe as compared to the first and second installation tabs T1,T2. Unlike the known shoe B', the first and second installation tabs T1,T2 are located in the outboard position, i.e., farther from the open mouth M of the respective slot L1,L2 in which they are located and farther from the midpoint between the first and second ends B1,B2 of the shoe as compared to the first and second side walls W1,W2. The first and second walls W1,W2 lie adjacent the outer edges SE1 of the springs 1S,2S at a location where the springs 1S,2S are spaced above the lower walls LW1,LW2 due to the arch of each spring 1S,2S, and the first and second side walls W1,W2 extend toward the inner surface IS at least flush (even) with and preferably completely past the outer surface 2Sa of the second spring 2S (or single spring 1S or 2S if only one spring is used). The outer surface 2Sa is defined as the spring surface closest to, oriented toward, and in contact with the inner surface IS of the shoe central portion B3, regardless of the number of springs 1S,2S included in the spring stack.

Figure 7C:
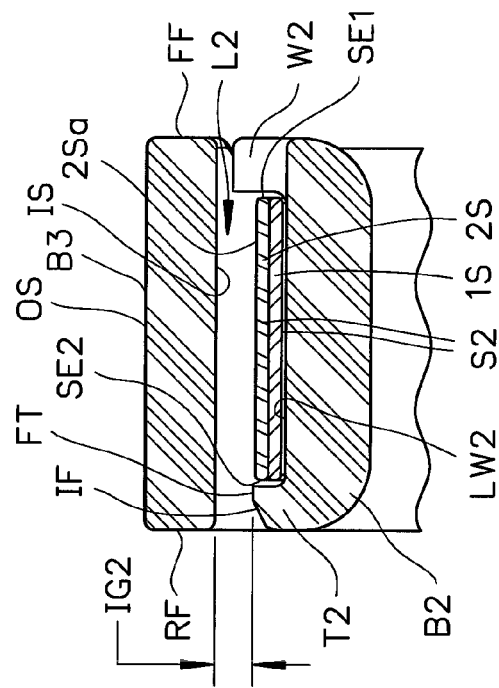
FIGS. 7C and 7D are section views taken at lines 7C-7C and 7D-7D of FIGS. 7A and 7B, respectively.
Figure 7D:
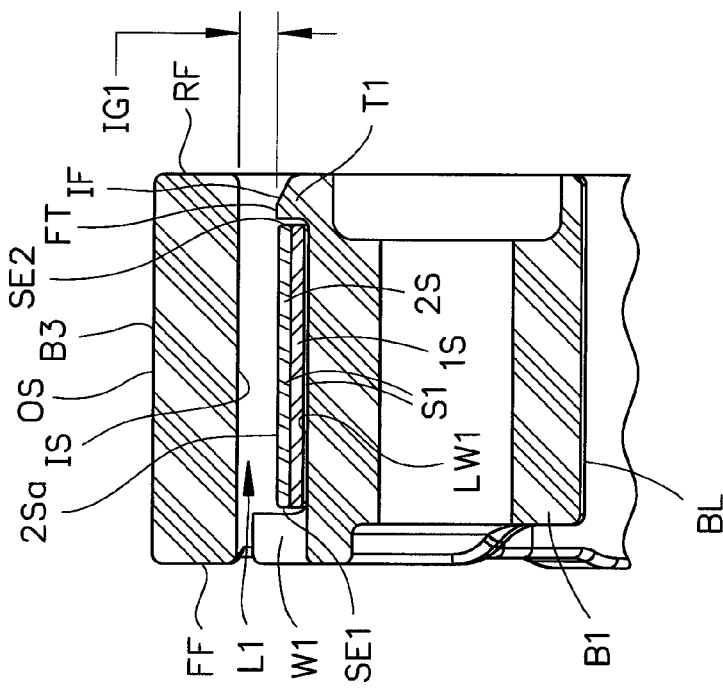

Because the first and second installation tabs T1,T2 are each located in the outboard position, the first installation tab T1 is located adjacent the inner edge SE2 of each spring 1S,2S in the region where the first end S1 of the first spring 1S contacts the first lower walls LW1, and the second installation tab T2 is located adjacent the inner edge SE2 of each spring 1S,2S in the region where the second end S2 of the first spring 1S contacts the second lower wall LW2. As such, even though the first and second installation tabs T1,T2 are shorter than the first and second side walls W1,W2 for the reasons noted above, the outboard location of the first and second installation tabs T1,T2 ensures that they are each able to extend toward the inner surface IS sufficiently to capture the complete stack of springs including both the first and second springs 1S,2S in the respective slots L1,L2, or the first and second installation tabs T1,T2 capture the single spring 1S or 2S if only one spring is used in the spring stack. In the illustrated embodiment, the first and second installation tabs T1,T2 extend toward the inner surface IS sufficiently such that at least part of each installation tab T1,T2 extends completely across or spans the thickness of the spring stack including both the first spring 1S and the second spring 2S as shown in FIGS. 7C and 7D. There, it can be seen that at least part of each installation tab T1,T2 extends toward the inner surface IS sufficiently to be at least flush (even) with or preferably project above the outer surface 2Sa of the second spring 2S. Those of ordinary skill in the art will recognize that in order to ensure the spring stack 1S,2S is laterally retained by the first and second installation tabs T1,T2 as described, tolerances must be accounted for such that the maximum magnitude of each of said first and second spring insertion gaps IG1,IG2 measured at the outboard edge of the respective installation tab T1,T2, i.e., measured at a location farthest from the mouth M of the respective slot L1,L2 and normal to the inner surface IS of the shoe central portion B3, will be less than or equal to a minimum distance defined between the inner surface IS of the shoe central portion B3 and the outer surface 2Sa of the spring stack when measured normal to the inner surface IS at the outboard edge of the respective installation tab. In other words, for all tolerance stack conditions, the first and second installation tabs T1,T2 will extend toward to the inner surface sufficiently such that at least part of each installation tab will be flush with or extend beyond the outer surface 2Sa of the spring stack 1S,2S.

Figure 8:
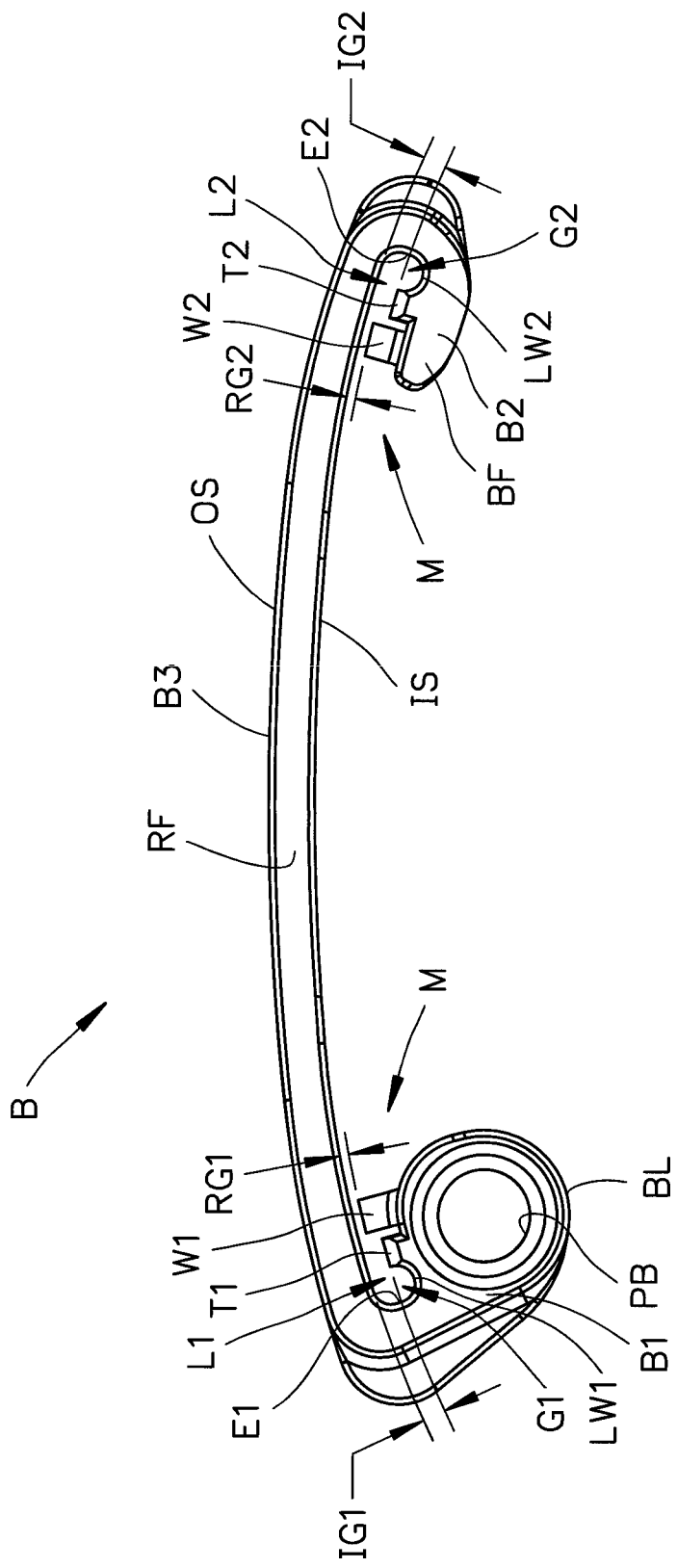
FIG. 8 provides a rear view of the polymeric shoe alone, without the springs installed.

In the embodiment in which the stack of springs includes only one of the springs 1S,2S, the first and second installation tabs T1,T2 extend toward the inner surface IS sufficiently such that at least part of each installation tab T1,T2 extends completely across or spans the thickness of the single spring stack such that at least part of each installation tab T1,T2 extends toward the inner surface IS sufficiently to be at least flush (even) with or preferably project beyond the outer surface 2Sa of the single spring 1S,2S. FIG. 8 provides a rear view of the shoe B alone, without the springs 1S,2S installed. It can be seen that the first and second installation tabs T1,T2 are each located in the outboard location and the first and second side walls W1,W2 are each located in the inboard location, meaning that the first and second side walls W1,W2 are each located closer to a midpoint of the shoe B in terms of the spacing between the first and second ends B1,B2 of the shoe B as compared to the first and second installation tabs T1,T2. As such, the distance separating the first and second installation tabs T1,T2 is greater than the distance separating the first and second side walls W1,W2. This outboard location of the first and second installation tabs T1,T2 ensures that they will effectively retain both the first and second springs 1S,2S because height of each installation tab T1,T2 above its respective lower wall LW1,LW2 is greater than or equal to the height of the outer surface 2Sa of the second spring 2S above the lower wall LW1,LW2 when measured at one or more locations (but not necessarily all locations) adjacent the respective installation tab T1,T2.

Referring to FIG. 8, the first slot L1 includes an end wall E1 that connects its lower wall LW1 to the shoe central portion B3 and that extends transversely relative to the shoe central portion B3. The end wall E1 extends between the front and rear faces FF,RF of the shoe B and closes the first slot L1 at the first end B1 of the shoe. Similarly, the second slot L2 includes an end wall E2 that connects its lower wall LW2 to the shoe central portion B3 and that extends transversely relative to the shoe central portion B3. The end wall E2 extends between the front and rear faces FF,RF of the shoe B and closes the second slot L2 at the second end B2 of the shoe. The first installation tab T1 is spaced inwardly apart from the first end wall E1 such that a first spring-end clearance space or gap G1 (see also FIG. 9) is defined between the first installation tab T1 and the end wall E1. Likewise, the second installation tab T2 is spaced inwardly apart from the second end wall E2 such that a second spring-end clearance space or gap G2 is defined between the second installation tab T2 and the second end wall E2. As described further below, these spring-end clearance gaps G1,G2 provide a space or path for accommodating the outermost tips of the opposite first and second ends S1,S2 of the first (lower) spring 1S when the first and second springs 1S,2S are installed on the shoe B.

Figure 9:
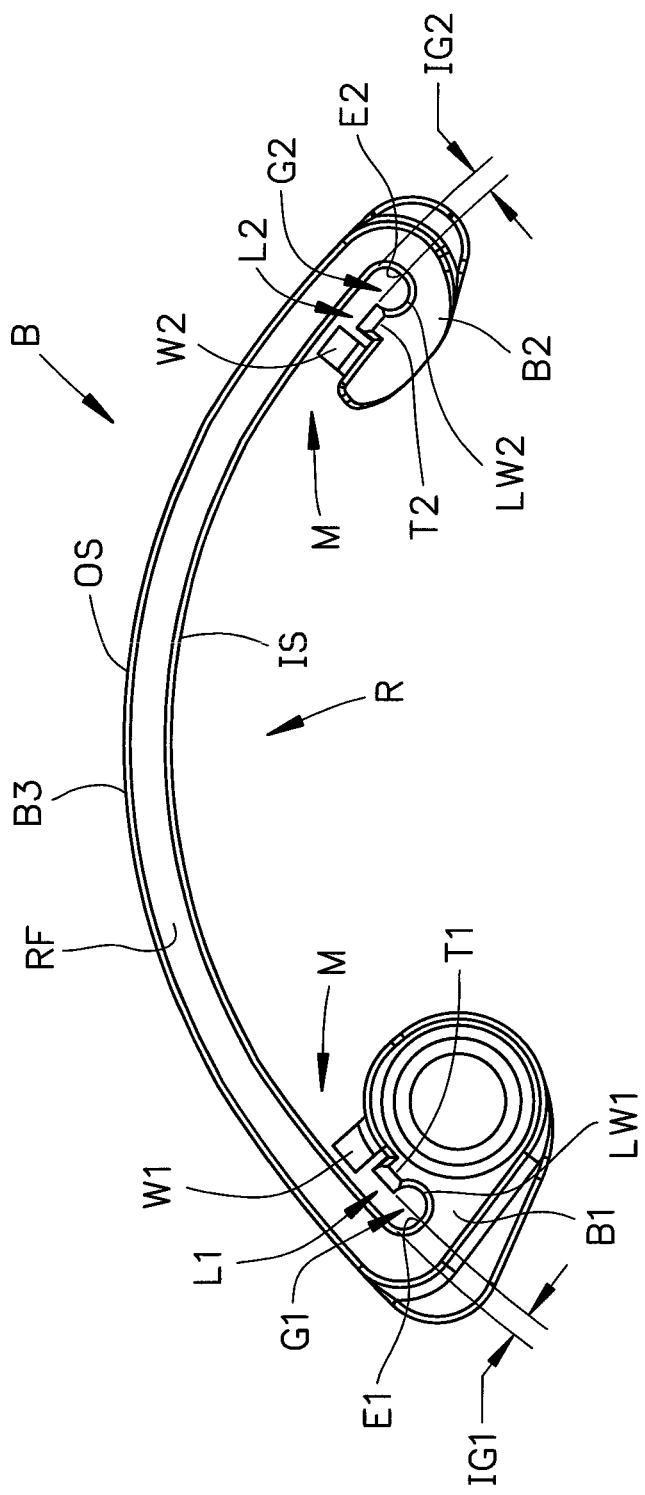
FIGS. 9 and 10 are respective rear and isometric views that show the polymeric shoe of FIG. 8 resilient deflected to a spring-install position for installation of the stacked and nested springs (the springs are shown in FIG. 10)
Figure 10:
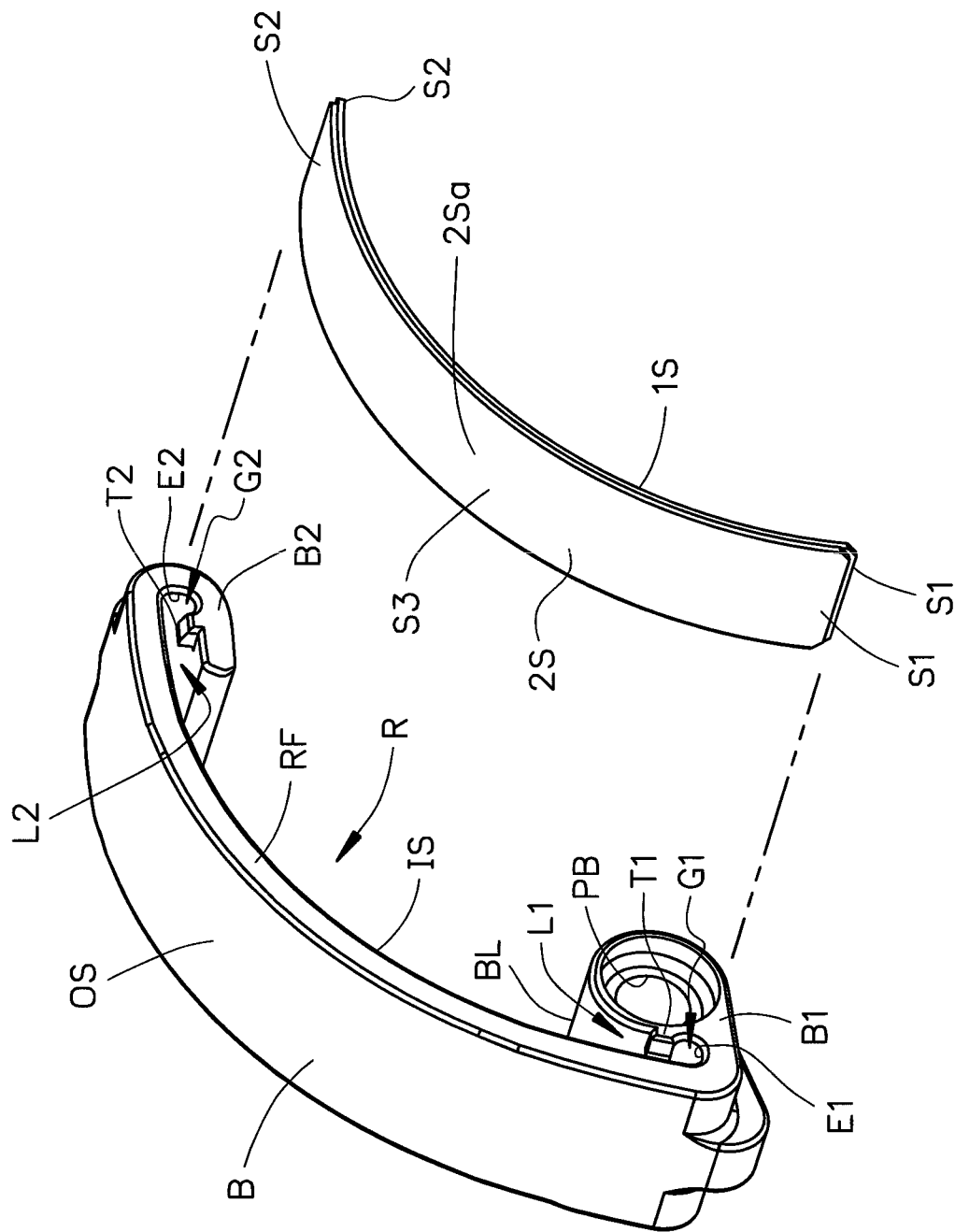
Figure 11:
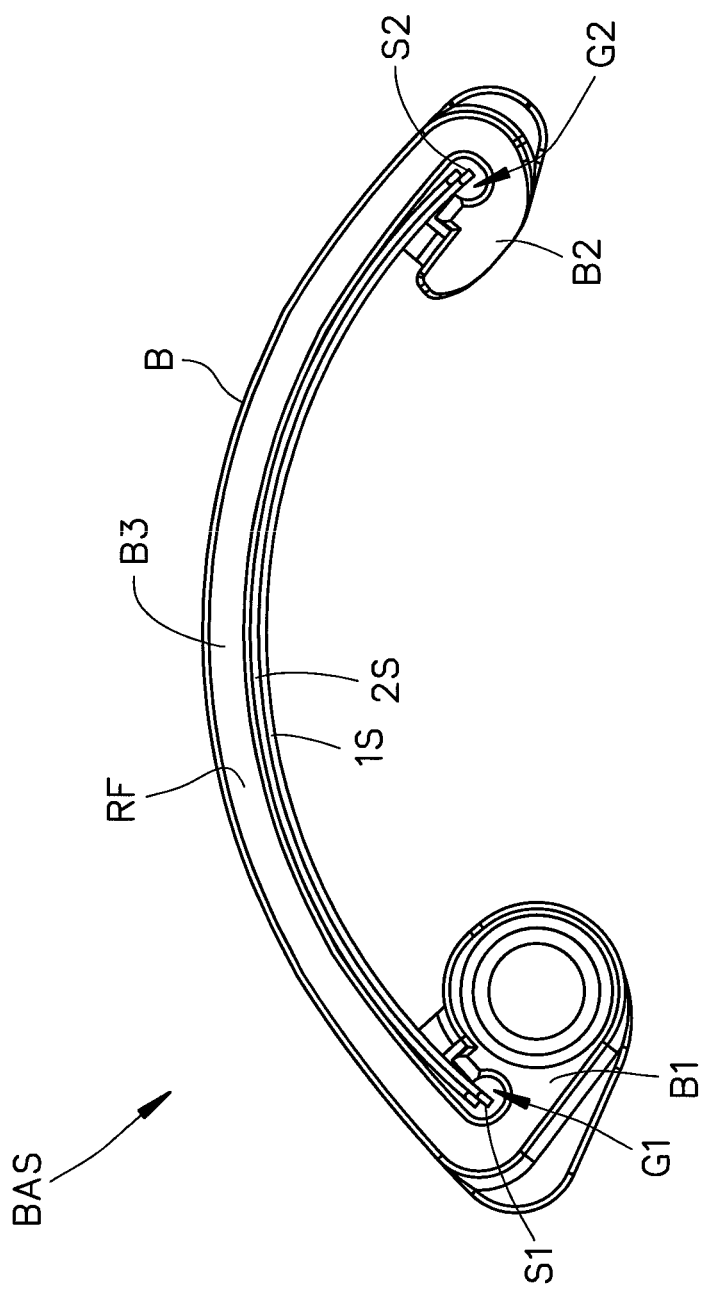
FIG. 11 shows the stacked and nested springs inserted into the slots L1,L2, with the shoe still deformed to the spring-install position of FIGS. 9 and 10.

To assemble the blade assembly BAS by installing the first and second springs 1S,2S, the shoe B is resiliently deformed as shown in FIGS. 9 and 10 to decrease the radius of the outer surface OS by decreasing the distance between the first and second shoe ends B1,B2, which causes the spring-receiving region R to temporarily assume a shape that approximates the free undeflected shape of the spring S as shown in FIGS. 9 and 10. With continuing reference to FIG. 10, the first and second springs 1S,2S are stacked and nested as shown, and their respective ends S1,S2 are then installed simultaneously into the first and second spring-receiving slots L1,L2 by insertion through the insertion gaps IG1,IG2 defined between the first and second installation tabs T1,T2 and the inner surface IS at the rear face RF of the shoe (the springs 1S,2S are optionally also resiliently deformed during this installation process). FIG. 11 shows the nested and stacked springs 1S,2S inserted into the slots L1,L2, with the shoe still deformed to the position of FIGS. 9 and 10.

As shown in FIG. 11, and more clearly in FIGS. 11A and 11B, the first and second spring-end clearance gaps G1,G2 facilitate simultaneous installation of the stacked first and second springs 1S,2S into the slots L1,L2 over the installation tabs T1,T2 in the case where the opposite ends S1,S2 of the first (lower) spring 1S would otherwise contact the installation tabs T1,T2 if the gaps G1,G2 were not present. For example, the presence of the spring-end clearance gaps G1,G2 facilitates installation of the stacked and nested springs 1S,2S as described in the case when the shoe B is deformed for spring installation but the ends S1,S2 of the first spring 1S do not align perfectly with the first and second slots L1,L2 due to manufacturing and assembly fixture tolerances. As such, the presence of the gaps G1,G2 allow the installation tabs T1,T2 to extend a greater distance toward the inner surface IS of the shoe central portion B3 than they otherwise could if the gaps G1,G2 were not present, which ensures that the tabs T1,T2 will extend toward the inner surface IS at least to a height that lies "flush" or even with or above the outer surface 2Sa of the second spring 2S for at least one location adjacent the tabs T1,T2. In particular, at least part of each of the first and second installation tabs T1,T2 overlaps at least the combined thickness of both the first and second springs 1S,2S when the springs are installed in the slots L1,L2, and the first and second installation tabs T1,T2 extend above the respective lower walls LW1,LW2 to a location where they terminate flush with or between the outer surface 2Sa of the second spring 2S and the inner surface IS of the blade central portion B3.

With reference to FIGS. 11A and 11B, the first slot L1 defines a first slot height LH1 between the first lower wall LW1 and the inner surface IS, and the second slot L2 defines a second slot height LH2 between the second lower wall LW2 and the inner surface IS, where both the first and second slot heights LH1,LH2 are measured as described below. It is preferred that the first and second slot heights LH1,LH2 be no greater than required for spring insertion and lateral retention of the springs S1,S2 after insertion. The minimum slot height LH1,LH2 will serve to optimize the structural strength and rigidity at the blade end regions B1,B2. Moreover, these tensioning devices T are usually packaged in confined spaces so it is a preferred design practice to minimize the overall slot heights LH1,LH2 for packaging purposes. As illustrated in FIG. 11A, the first slot height LH1 is defined as:

$$LH1 = TH1 + IG1, \text{ where}$$

TH1 is the maximum height of installation tab T1 above the lower wall LW1 and IG1 is the maximum spring insertion gap distance IG1 defined between the first installation tab T1 and the inner surface IS of the blade central portion B3. Correspondingly, the second slot height LH2 is defined as:

$$LH2 = TH2 + IG2, \text{ where}$$

TH2 is the maximum height of installation tab T2 above the lower wall LW2 and IG2 is the maximum spring insertion gap distance IG2 defined between the second installation tab T2 and the inner surface IS of the blade central portion B3. A multiple-spring design will typically require the overall slot height LH1,LH2 to be greater than that needed for a single spring design, and FIGS. 11A and 11B show the required insertion gaps IG1,IG2 and tab heights TH1,TH2 to effectively laterally restrain both fully installed springs 1S,2S.

After the stacked and nested first and second springs 1S,2S are fully received in the first and second slots L1,L2 as shown in FIG. 11, the shoe B (and also the springs 1S,2S if they have been deflected during the installation process) are allowed to relax such that the opposite ends of the springs 1S,2S are captured in the slots L1,L2 and the outer surface 2Sa of the arched central portion S3 of the second spring 2S is abutted with the inner surface IS of the shoe central portion B3 as described above and as shown in FIG. 7.

Those of ordinary skill in the art will recognize that the first and second installation tabs T1,T2 can alternatively be located adjacent the front edge FE of the shoe B (still in the outboard position) and the first and second side walls W1,W2 can alternatively be located adjacent the rear edge RE of the shoe (still in the inboard position) without departing from the scope and intent of the present development.

The invention has been described with reference to preferred embodiments. Modifications and alterations will occur to those of ordinary skill in the art to which the invention pertains, and it is intended that the claims be construed as broadly as possible to encompass all such modifications and alterations while preserving their validity.

The invention claimed is:

1. A chain tensioner blade assembly comprising:
   a polymeric shoe comprising a first end, a second end, and a central portion that extends between the first end and the second end, said central portion comprising: (i) an outer surface adapted for being slidably engaged by an associated chain; and, (ii) an inner surface located on an opposite side of said central portion relative to said outer surface;
   a pivot bore defined in the first end of the shoe;
   a first spring-receiving slot located in said first end of said shoe and a second spring-receiving slot located in said second end of said shoe, said first spring-receiving slot including an open mouth oriented toward the second spring-receiving slot, and said second spring-receiving slot including an open mouth oriented toward the first spring-receiving slot;
   said first spring-receiving slot, said second spring-receiving slot, and said inner surface of said shoe providing a spring-receiving region;

said first spring-receiving slot comprising:
(i) a first lower wall that is spaced from and faces the inner surface of said shoe central portion; (ii) a first side wall connected to and projecting outwardly from said first lower wall and extending toward, but not connected to, the inner surface so that a first spring retention gap is defined between said first side wall and said inner surface; (iii) a first installation tab connected to said first lower wall, said first installation tab extending toward, but not connected to, said inner surface of said shoe central portion such that a first spring insertion gap is defined between said first installation tab and said inner surface, wherein a minimum magnitude of said first spring retention gap is smaller than a minimum magnitude of said first spring insertion gap;

said second spring-receiving slot comprising:
(i) a second lower wall that is spaced from and faces the inner surface of said shoe central portion; (ii) a second side wall connected to and projecting outwardly from said second lower wall and extending toward, but not connected to, the inner surface so that a second spring retention gap is defined between said second side wall and said inner surface; (iii) a second installation tab connected to said second lower wall, said second installation tab extending toward, but not connected to, said inner surface of said shoe central portion such that a second spring insertion gap is defined between said second installation tab and said inner surface, wherein a minimum magnitude of said second spring retention gap is smaller than a minimum magnitude of said second spring insertion gap;

a spring stack comprising at least a first leaf spring located in the spring-receiving region of said shoe, said spring stack comprising: (i) a first end located in the first spring-receiving slot between the first side wall and the first installation tab; (ii) a second end located in the second spring-receiving slot between the second side wall and the second installation tab; (iii) a central portion located between and connecting said first and second ends of said spring stack, said central portion of said spring stack comprising an outer surface in contact with said inner surface of said shoe central portion;

wherein said first and second installation tabs are located in an outboard position relative to said first and second side walls such that said first and second installation tabs are spaced farther apart from each other as compared to said first and second side walls and farther from a midpoint of said shoe located between said first and second ends of said shoe as compared to said first and second side walls;

each of said first and second side walls and each of said first and second installation tabs extending toward said inner surface of said shoe central portion sufficiently such that at least part of each of said first and second side walls and at least part of each of said first and second installation tabs is flush with or extends beyond said outer surface of said spring stack.

2. The chain tensioner blade assembly as set forth in claim 1, wherein said first and second installation tabs each comprise:
an inclined face that extends from adjacent the rear face of the shoe and that extends closer to the inner surface of the shoe as the inclined face extends inwardly away from the rear face of the shoe;
a transition face generally oriented toward the inner surface of the shoe and comprising a first end connected to the inclined face;
a lock face oriented transverse to and connected to a second end of the transition face, said lock face oriented said front face of the shoe.

3. The chain tensioner blade assembly as set forth in claim 2, wherein said transition face of each of said first and second installation tabs is a flat surface that intersects said lock face at a right angle.

4. The chain tensioner blade assembly as set forth in claim 1, wherein:
said first slot includes a first end wall that connects the first lower wall to the shoe central portion and that extends transversely relative to the shoe central portion;
said second slot includes a second end wall that connects the second lower wall to the shoe central portion and that extends transversely relative to the shoe central portion;
said first installation tab is spaced apart from the first end wall such that a first spring-end clearance space is defined between the first installation tab and the first end wall;
said second installation tab is spaced inwardly apart from the second end wall such that a second spring-end clearance space is defined between the second installation tab and the second end wall;
said first and second spring-end clearance spaces respectively provide a space for accommodating the first and second opposite ends of the spring stack when said spring stack is installed into said spring receiving region through said first and second spring insertion gaps.

5. The chain tensioner blade assembly as set forth in claim 1, wherein:
said first installation tab comprises a first outboard edge spaced a maximum distance from said mouth of said first slot;
said second installation tab comprises a second outboard edge spaced a maximum distance from said mouth of said second slot; and,
a maximum magnitude of each of said first and second spring insertion gaps when measured respectively at said first and second outboard edges and normal to the inner surface of the shoe central portion is less than or equal to a minimum distance defined between the inner surface of the shoe central portion and the outer surface of the spring stack when measured normal to the inner surface at the respective first and second outboard edges.

6. The chain tensioner blade assembly as set forth in claim 5, further comprising a bracket including a main wall, a support flange that projects outwardly from said main wall and that defines a ramp, an outer wall that extends transversely from an outer end of said ramp such that a channel is defined between the main wall, the outer wall, and the ramp, and a pin connected to and projecting outwardly from the main wall;
wherein said chain tensioner blade assembly is mounted on said bracket with said pin located in the pivot bore defined in said first end of said shoe, and with said second end of said shoe located in said channel and supported on said ramp.

7. The chain tensioner blade assembly as set forth in claim 1, wherein said spring stack comprises at least first and second nested leaf springs.

8. The chain tensioner blade assembly as set forth in claim 7, wherein said first spring comprises opposite first and second ends that are respectively in contact with said first and second lower walls, and said outer surface of said spring stack is defined by an exposed surface of said second spring that is in contact with said inner surface of said shoe central portion.

9. The chain tensioner blade assembly as set forth in claim 8, wherein each of said first and second side walls and each of said first and second installation tabs extends toward said inner surface of said shoe central portion sufficiently such that at least part of each of said first and second side walls and at least part of each of said first and second installation tabs is flush with or extends beyond said exposed surface of said second spring that is in contact with said inner surface of said shoe central portion.

10. The chain tensioner blade assembly as set forth in claim 6, wherein said first and second side walls are located adjacent a front face of said shoe and said first and second installation tabs are located adjacent a rear face of said shoe that is oriented toward and that lies adjacent said main wall of said bracket.

11. A chain tensioner comprising:
a bracket comprising: (i) a main wall; (ii) a pivot pin projecting outwardly from the main wall; and, (iii) a ramp that extends outwardly from the main wall; and,
a tensioner blade assembly operatively connected to said bracket, said tensioner blade assembly comprising:
a polymeric shoe comprising a first end, a second end, and a central portion that extends between the first end and the second end, said central portion comprising: (i) an outer surface adapted for sliding movement of an associated chain thereon; and, (ii) an inner surface located on an opposite side of said central portion relative to said outer surface;
a pivot bore defined in the first end of the shoe, wherein said pivot pin is received in said pivot bore and said second end of said shoe is supported on said ramp;
said first end of said shoe comprising a first spring receiving slot and said second end of said shoe comprising a second spring receiving slot, said first spring receiving slot including an open mouth oriented toward said second spring receiving slot, and said second spring receiving slot including an open mouth oriented toward said first spring receiving slot;
said, first spring receiving slot, said second spring-receiving slot, and said inner surface of said shoe providing a spring-receiving region;
said first spring receiving slot comprising:
(i) a first lower wall that is spaced from and faces the inner surface of said shoe central portion;
(ii) a first side wall connected to and projecting outwardly from said first lower wall, extending part-way toward, but not connected to, the inner surface;
(iii) a first installation tab connected to said first lower wall, said first installation tab extending only partially toward and spaced from said inner surface of said shoe central portion, said first installation tab having a reduced height above said first lower wall as compared to said first side wall, and said first installation tab located in an outboard position where it is located farther from said open mouth of said first spring receiving slot as compared to said first side wall;
said second spring receiving slot comprising:
(i) a second lower wall that is spaced from and faces the inner surface of said shoe central portion;
(ii) a second side wall connected to and projecting outwardly from said second lower wall, extending part-way toward, but not connected to, the inner surface;
(iii) a second installation tab connected to said second lower wall, said second installation tab extending only partially toward and spaced from said inner surface of said shoe central portion, said second installation tab having a reduced height above said second lower wall as compared to said second side wall, and said second installation tab located in an outboard position where it is located farther from said open mouth of said second spring receiving slot as compared to said second side wall;
a spring stack comprising at least one leaf spring located in the spring receiving region, said spring stack comprising:
(i) a first end located in the first spring receiving slot between the first side wall and the first installation tab;
(ii) a second end located in the second spring receiving slot between the second side wall and the second installation tab; and,
(iii) a central portion located between said first end and said second end, wherein said central portion of said spring stack includes an outer surface in contact with said inner surface of said shoe central portion;
wherein said first and second installation tabs and said first and second side walls extend respectively outward from said first and second lower walls to respective heights where at least part of each of said first and second installation tabs and at least part of each of said first and second side walls are flush with or extend above said outer surface of said spring stack to capture said spring stack in said spring receiving region.

12. The chain tensioner as set forth in claim 11, wherein said first and second installation tabs each comprise:
an inclined face that extends from adjacent the rear face of the shoe and that extends closer to the inner surface of the shoe as the inclined face extends inwardly away from the rear face of the shoe;
a transition face generally oriented toward the inner surface of the shoe and comprising a first end connected to the inclined face;
a lock face oriented transverse to and connected to a second end of the transition face, said lock face oriented toward said front face of the shoe.

13. The chain tensioner as set forth in claim 12, wherein said transition face of each of said first and second installation tabs is a flat surface that intersects said lock face at a right angle.

14. The chain tensioner as set forth in claim 11, wherein:
said first slot includes a first end wall that connects the first lower wall to the shoe central portion and that extends transversely relative to the shoe central portion;
said second slot includes a second end wall that connects the second lower wall to the shoe central portion and that extends transversely relative to the shoe central portion;
said first installation tab is spaced apart from the first end wall such that a first spring-end clearance space is defined between the first installation tab and the first end wall;
said second installation tab is spaced inwardly apart from the second end wall such that a second spring-end clearance space is defined between the second installation tab and the second end wall;
said first and second spring-end clearance spaces respectively provide a space for accommodating the first and second opposite ends of the spring stack when said spring stack is installed into said spring receiving region through said first and second spring insertion gaps.

15. The chain tensioner as set forth in claim 11, wherein:
said first installation tab comprises a first outboard edge spaced a maximum distance from said mouth of said first slot;

said second installation tab comprises a second outboard edge spaced a maximum distance from said mouth of said second slot; and, a maximum magnitude of each of said first and second spring insertion gaps when measured respectively at said first and second outboard edges and normal to the inner surface of the shoe central portion is less than or equal to a minimum distance defined between the inner surface of the shoe central portion and the outer surface of the spring stack when measured normal to the inner surface at the respective first and second outboard edges.

16. The chain tensioner as set forth in claim 11, wherein said spring stack comprises at least first and second nested leaf springs.

17. The chain tensioner as set forth in claim 16, wherein said first spring comprises opposite first and second ends that are respectively in contact with said first and second lower walls, and said outer surface of said spring stack is defined by an exposed surface of said second spring that is in contact with said inner surface of said shoe central portion.

18. The chain tensioner as set forth in claim 17, wherein each of said first and second side walls and each of said first and second installation tabs extends toward said inner surface of said shoe central portion sufficiently such that at least part of each of said first and second side walls and at least part of each of said first and second installation tabs is flush with or extends beyond said exposed surface of said second spring that is in contact with said inner surface of said shoe central portion.

19. The chain tensioner as set forth in claim 18, wherein said first and second side walls are located adjacent a front face of said shoe and said first and second installation tabs are located adjacent a rear face of said shoe that is oriented toward and that lies adjacent said main wall of said bracket.

\* \* \* \* \*